(12) United States Patent
Hayashida et al.

(10) Patent No.: US 8,430,953 B2
(45) Date of Patent: Apr. 30, 2013

(54) WATER-BASED INK FOR INK-JET RECORDING, INK CARTRIDGE, AND INK-JET RECORDING APPARATUS

(75) Inventors: Kenta Hayashida, Inazawa (JP); Kazuma Goto, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 305 days.

(21) Appl. No.: 12/888,667

(22) Filed: Sep. 23, 2010

(65) Prior Publication Data

US 2011/0128331 A1 Jun. 2, 2011

(30) Foreign Application Priority Data

Nov. 30, 2009 (JP) ................................. 2009-272386
Nov. 30, 2009 (JP) ................................. 2009-272387
Nov. 30, 2009 (JP) ................................. 2009-272388
Nov. 30, 2009 (JP) ................................. 2009-272389

(51) Int. Cl.
*C09D 11/02* (2006.01)

(52) U.S. Cl.
USPC .................................... 106/31.47; 106/31.49

(58) Field of Classification Search ............... 106/31.47, 106/31.49; 347/100
See application file for complete search history.

(56) References Cited

U.S. PATENT DOCUMENTS

| | | | |
|---|---|---|---|
| 5,367,075 A | 11/1994 | Nakamatsu et al. | |
| 5,599,386 A | 2/1997 | Sano et al. | |
| 5,609,673 A | 3/1997 | Takimoto et al. | |
| 5,795,375 A | 8/1998 | Yamazaki et al. | |
| 6,365,720 B1 | 4/2002 | Schacht et al. | |
| 6,444,807 B1 | 9/2002 | Wolleb et al. | |
| 6,488,751 B1 | 12/2002 | Takemoto | |
| 6,495,250 B1 | 12/2002 | Schacht et al. | |
| 7,270,701 B2 * | 9/2007 | Jinnou et al. ................. | 106/31.47 |
| 7,303,618 B1 * | 12/2007 | Taga et al. ................... | 106/31.49 |
| 7,425,233 B2 * | 9/2008 | Hamajima et al. ......... | 106/31.49 |
| 7,476,270 B2 | 1/2009 | McGorrin | |
| 7,566,362 B2 * | 7/2009 | Mori et al. ................. | 106/31.47 |
| 7,585,361 B2 * | 9/2009 | Yoneda et al. .............. | 106/31.47 |
| 7,591,888 B2 * | 9/2009 | Fujii et al. .................. | 106/31.47 |
| 7,611,571 B2 * | 11/2009 | Yamashita et al. ......... | 106/31.47 |
| 7,632,344 B2 | 12/2009 | McGorrin | |
| 7,674,329 B2 | 3/2010 | Koga et al. | |
| 7,713,343 B2 | 5/2010 | Goto et al. | |
| 7,727,321 B2 | 6/2010 | Goto et al. | |
| 7,854,797 B2 * | 12/2010 | Fujii et al. .................. | 106/31.47 |
| 7,871,464 B2 | 1/2011 | Ono et al. | |
| 8,226,222 B2 | 7/2012 | Kajiura et al. | |
| 2003/0105321 A1 | 6/2003 | Wolleb et al. | |
| 2004/0089200 A1 | 5/2004 | Fujiwara et al. | |
| 2004/0122219 A1 | 6/2004 | Fujiwara et al. | |
| 2005/0057629 A1 | 3/2005 | Taguchi et al. | |
| 2005/0104944 A1 | 5/2005 | Robertson et al. | |
| 2005/0115458 A1 | 6/2005 | Oki et al. | |
| 2005/0115459 A1 | 6/2005 | Hanmura et al. | |
| 2005/0215773 A1 | 9/2005 | Tateishi et al. | |
| 2006/0016026 A1 | 1/2006 | Tateishi et al. | |
| 2006/0156951 A1 | 7/2006 | Patel | |
| 2007/0173641 A1 | 7/2007 | Fujiwara et al. | |
| 2007/0263055 A1 | 11/2007 | Kitamura et al. | |
| 2008/0241398 A1 | 10/2008 | Kato et al. | |
| 2008/0274284 A1 | 11/2008 | Fujimoto et al. | |
| 2008/0274286 A1 | 11/2008 | Yamashita et al. | |
| 2009/0000511 A1 | 1/2009 | Kitamura et al. | |
| 2009/0029120 A1 | 1/2009 | Fujii et al. | |
| 2009/0151599 A1 * | 6/2009 | Fujii et al. .................. | 106/31.47 |
| 2009/0202798 A1 * | 8/2009 | Patel .......................... | 106/31.47 |
| 2010/0112218 A1 | 5/2010 | Fujii et al. | |
| 2010/0209678 A1 | 8/2010 | Ono et al. | |
| 2010/0251933 A1 | 10/2010 | Dodge et al. | |
| 2011/0032302 A1 | 2/2011 | Kajiura et al. | |
| 2011/0128331 A1 | 6/2011 | Hayashida et al. | |
| 2011/0128332 A1 | 6/2011 | Maeda et al. | |
| 2011/0128333 A1 * | 6/2011 | Goto et al. ................. | 106/31.48 |
| 2012/0081453 A1 * | 4/2012 | Tsuzaka et al. ............ | 106/31.48 |
| 2012/0081454 A1 * | 4/2012 | Ito et al. ..................... | 106/31.47 |

FOREIGN PATENT DOCUMENTS

| | | |
|---|---|---|
| EP | 1985668 A1 | 10/2008 |
| EP | 1988134 A2 | 11/2008 |
| EP | 2017309 A1 | 1/2009 |
| EP | 2128202 | 2/2009 |
| EP | 2206747 A1 | 7/2010 |
| JP | 03-103484 | 4/1991 |

| | | | |
|---|---|---|---|
| JP | 07-278478 A | 10/1995 |
| JP | 08-073791 A | 3/1996 |
| JP | 08-311375 A | 11/1996 |
| JP | 09-137098 A | 5/1997 |
| JP | 09-202043 A | 8/1997 |
| JP | 09-235484 A | 9/1997 |
| JP | 09-241555 A | 9/1997 |
| JP | 2000-178491 A | 6/2000 |
| JP | 2000-265099 A | 9/2000 |
| JP | 2000-303009 | 10/2000 |
| JP | 2002-526589 | 8/2002 |
| JP | 2002-371079 A | 12/2002 |
| JP | 2002-371214 A | 12/2002 |
| JP | 2003-213168 | 7/2003 |
| JP | 2003-231823 A | 8/2003 |
| JP | 2004-002670 | 1/2004 |
| JP | 2005-075778 | 3/2005 |
| JP | 2005-520029 | 7/2005 |
| JP | 2006-503148 | 1/2006 |
| JP | 2006-028450 | 2/2006 |
| JP | 2007-277416 | 10/2007 |
| JP | 2008-013706 | 1/2008 |
| JP | 2008202011 A | 9/2008 |
| JP | 2008-246821 | 10/2008 |
| JP | 2009-057540 | 3/2009 |
| WO | 2007-091631 | 8/2007 |
| WO | 2007144586 A2 | 12/2007 |
| WO | 2008-111635 | 9/2008 |
| WO | 2009/054829 A1 | 4/2009 |
| WO | 2009-060654 A1 | 5/2009 |
| WO | 2009119656 A1 | 10/2009 |

OTHER PUBLICATIONS

Extended European search report for application No. 10252010.3 mailed Mar. 4, 2011.
Extended EP Search Report dtd Mar. 15, 2011, EP app. 10252011.1-2102.
Extended European search report for application No. 10252012.9 mailed Mar. 16, 2011.

\* cited by examiner

*Primary Examiner* — Helene Klemanski
(74) *Attorney, Agent, or Firm* — Banner & Witcoff, Ltd.

(57) ABSTRACT

A water-based ink for ink-jet recording includes a coloring agent, water, and a water-soluble organic solvent. The coloring agent includes the following a dye (1) and a dye (2).

dye (1): a dye represented by the general formula (1)

dye (2): at least one dye selected from the group consisting of dyes represented by the general formula (2a), dyes represented by the general formula (2b), C. I. Direct Blue 199, and C. I. Direct Blue 86

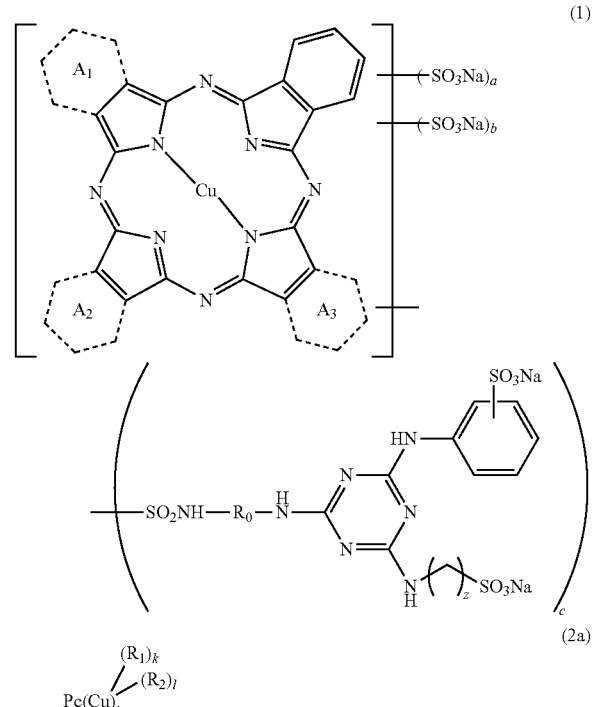

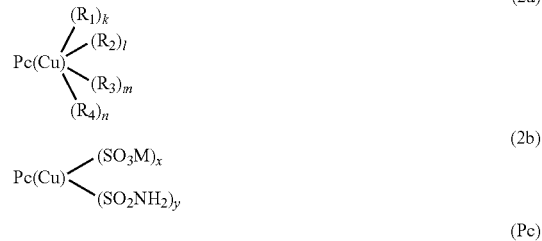

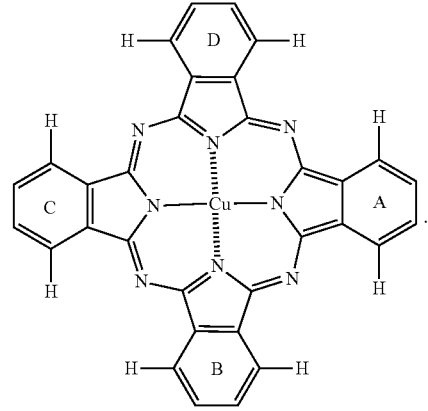

8 Claims, 1 Drawing Sheet

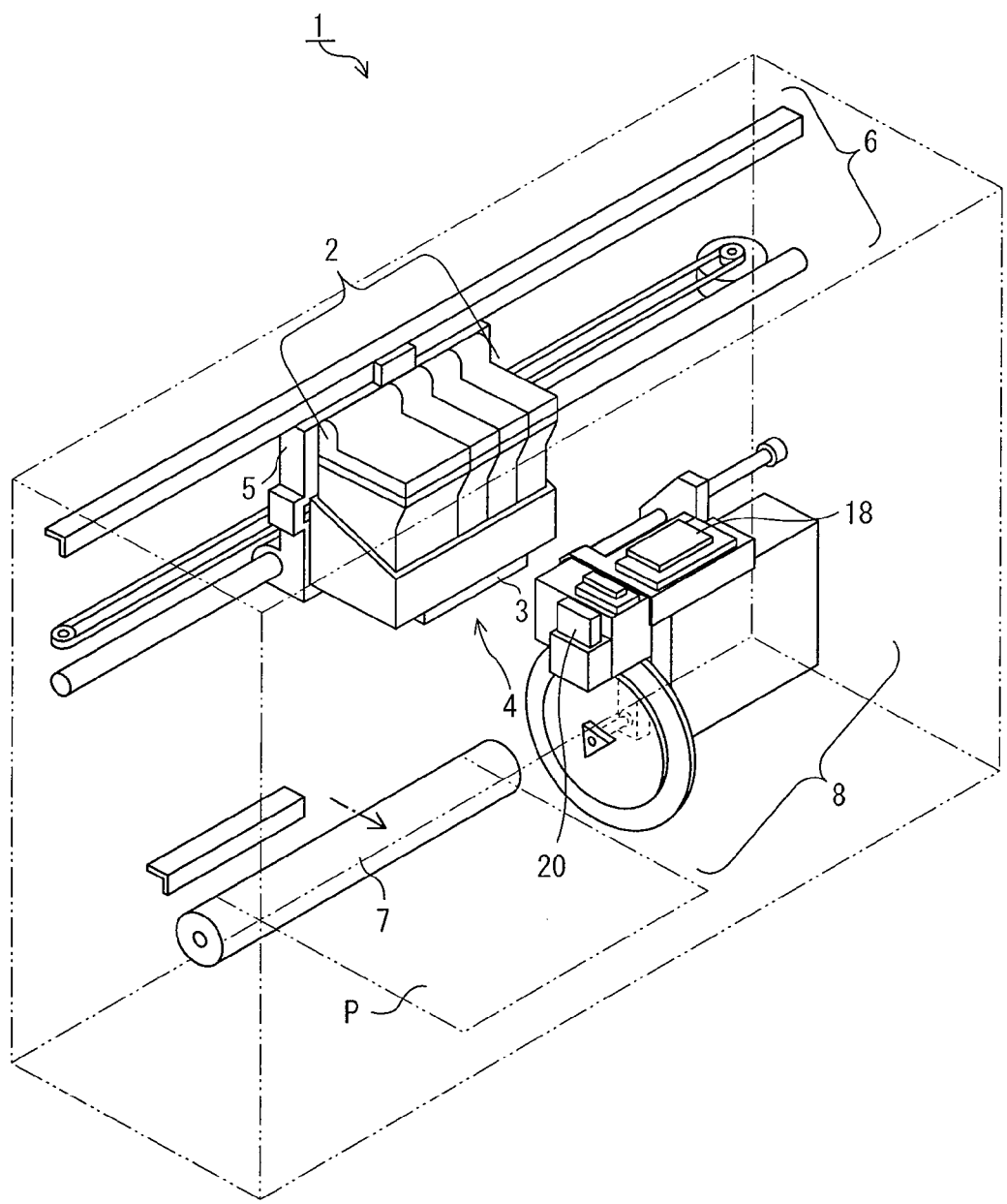

WATER-BASED INK FOR INK-JET RECORDING, INK CARTRIDGE, AND INK-JET RECORDING APPARATUS

CROSS-REFERENCE TO RELATED APPLICATION

This application claims priority from Japanese Patent Application Nos. 2009-272386, 2009-272387, 2009-272388, and 2009-272389 filed on Nov. 30, 2009. The entire subject matter of the Japanese Patent Applications is incorporated herein by reference.

BACKGROUND

Heretofore, as cyan inks for ink-jet recording, inks containing cyan dyes such as C. I. Acid Blue 74, C. I. Acid Blue 9, and the like have been known. However, these cyan dyes do not have sufficient light resistance. Therefore, for commercially available cyan inks for ink-jet recording, copper phthalocyanine dyes such as C. I. Direct Blue 86, C. I. Direct Blue 199, and the like are widely used. These typical copper phthalocyanine dyes are superior in the light resistance as compared to magenta dyes and yellow dyes. However, these copper phthalocyanine dyes are prone to be faded or discolored due to contact with ozone. Thus, there is a problem that discoloration or optical density reduction occurs in a recorded object. Therefore, a copper phthalocyanine dye having higher ozone resistance has been proposed.

The conventional cyan inks are required to be superior in the light resistance and the ozone resistance. In addition to that, the conventional cyan inks are required to be superior in color developing properties and not to cause bronzing. However, there were no conventional inks that satisfy all these performances. The bronzing is a phenomenon in which glare (irregular reflection) like metallic luster occurs on a surface of a recording medium such as a glossy paper or the like due to association or aggregation of dyes.

SUMMARY

A water-based ink for ink-jet recording comprises a coloring agent, water, and a water-soluble organic solvent. The coloring agent comprises the following a dye (1) and a dye (2).

dye (1): a dye represented by the general formula (1)
dye (2): at least one dye selected from the group consisting of dyes represented by the general formula (2a), dyes represented by the general formula (2b), C. I. Direct Blue 199, and C. I. Direct Blue 86

In the general formula (1), rings $A_1$, $A_2$, and $A_3$ each represent a benzene ring, a 2,3-pyridine ring, or a 3,2-pyridine ring, at least one of the rings $A_1$, $A_2$, and $A_3$ is a 2,3-pyridine ring or a 3,2-pyridine ring, and the rings $A_1$, $A_2$, and $A_3$ may be identical to or different from each other;

a satisfies $0 \leq a \leq 4$, b satisfies $0 \leq b \leq 4$, c satisfies $0 \leq c \leq 4$, and a, b, and c satisfy $0 \leq a+b+c \leq 4$;

z is an integer satisfying $1 \leq z \leq 3$; and $R_0$ is a straight chain alkyl group having 1 to 6 carbon atoms.

(2a)

In the general formula (2a),

Pc (Cu) represents a copper phthalocyanine nucleus represented by the following general formula (Pc);

$R_1$, $R_2$, $R_3$, and $R_4$ each represent a substituent selected from the group consisting of $-SO_2R_a$, $-SO_2NR_bR_c$, and $-CO_2R_a$, $R_1$, $R_2$, $R_3$, and $R_4$ are not all identical, at least one of $R_1$, $R_2$, $R_3$, and $R_4$ has an ionic hydrophilic group as a substituent, and at least one of $R_1$, $R_2$, $R_3$, and $R_4$ is present on any of the four benzene rings A, B, C, and D of the copper phthalocyanine nucleus represented by the general formula (Pc);

$R_a$ represents a substituted or unsubstituted alkyl group, $R_b$ represents a hydrogen atom or a substituted or unsubstituted alkyl group, and $R_c$ represents a substituted or unsubstituted alkyl group;

k satisfies $0 < k < 8$, l satisfies $0 < l < 8$, m satisfies $0 < m < 8$, n satisfies $0 \leq n < 8$, and k, l, m, and n satisfy $4 \leq k+l+m+n \leq 8$.

(2b)

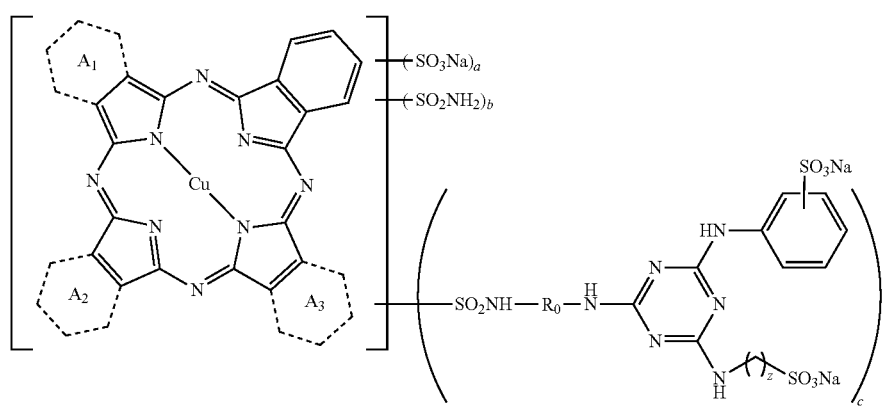

(1)

In the general formula (2b),

Pc (Cu) represents a copper phthalocyanine nucleus represented by the general formula (Pc);

M represents lithium, sodium, potassium, or ammonium;

x satisfies $0<x<4$, y satisfies $0<y<4$, and x and y satisfy $2\leq x+y\leq 5$; a $SO_3M$ group and a $SO_2NH_2$ group are present on any of the four benzene rings A, B, C, and D of the copper phthalocyanine nucleus represented by the general formula (Pc).

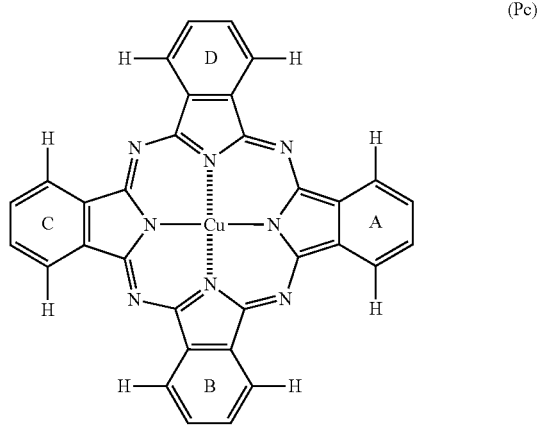

(Pc)

An ink cartridge comprises the water-based ink for ink-jet recording.

An ink-jet recording apparatus comprises an ink storing portion and an ink ejecting unit. An ink stored in the ink storing portion is ejected by the ink ejecting unit. The ink cartridge is stored in the ink storing portion.

BRIEF DESCRIPTION OF THE DRAWING

FIG. 1 is a schematic perspective view showing an example of the configuration of the ink-jet recording apparatus.

DETAILED DESCRIPTION

The water-based ink for ink-jet recording (hereinafter, this may also be referred to simply as the "water-based ink" or "ink") is described. The water-based ink comprises a coloring agent, water, and a water-soluble organic solvent. As described above, the coloring agent contains the dye (1) and the dye (2).

As described above, the dye (1) is a dye represented by the general formula (1).

As described above, in the general formula (1), rings $A_1$, $A_2$, and $A_3$ each represent a benzene ring, a 2,3-pyridine ring, or a 3,2-pyridine ring, at least one of the rings $A_1$, $A_2$, and $A_3$ is a 2,3-pyridine ring or a 3,2-pyridine ring, and the rings $A_1$, $A_2$, and $A_3$ may be identical to or different from each other;

a satisfies $0\leq a\leq 4$, b satisfies $0\leq b\leq 4$, c satisfies $0\leq c\leq 4$, and a, b, and c satisfy $0\leq a+b+c\leq 4$;

z is an integer satisfying $1\leq z\leq 3$; and $R_0$ is a straight chain alkyl group having 1 to 6 carbon atoms.

A compound represented by the general formula (1) may be a compound in which all of the rings $A_1$, $A_2$, and $A_3$ are 2,3-pyridine rings or 3,2-pyridine rings, a compound in which two of the $A_1$, $A_2$, and $A_3$ are 2,3-pyridine rings or 3,2-pyridine rings and the other one is a benzene ring, or a compound in which one of the $A_1$, $A_2$, and $A_3$ is a 2,3-pyridine ring or a 3,2-pyridine ring and the other two are benzene rings. The dye (1) may be composed of one of the aforementioned compounds or may be a mixture containing two or more of the aforementioned compounds.

Examples of the dye (1) include compounds represented by the chemical formulae (1-A) to (1-F).

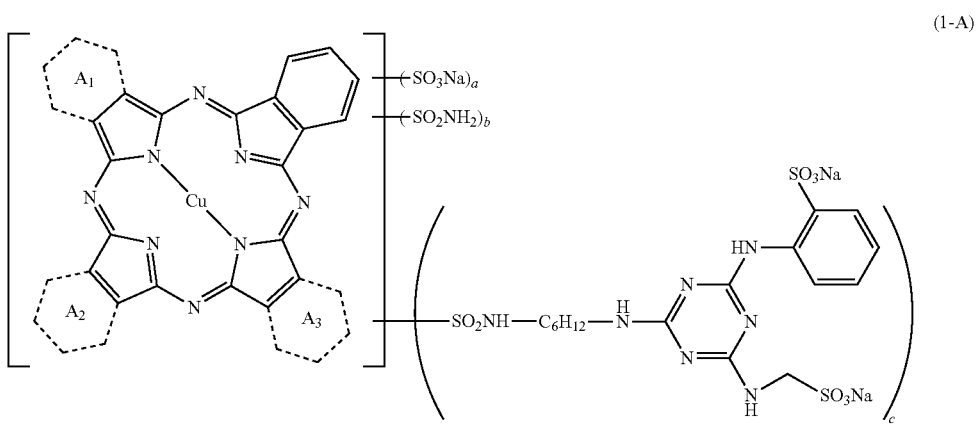

(1-A)

In the chemical formula (1-A), rings $A_1$, $A_2$, and $A_3$ each independently represent a 2,3-pyridine ring or a 3,2-pyridine ring; and a is 1.0, b is 1.8, c is 1.2, and a, b, and c are average values in a mixture.

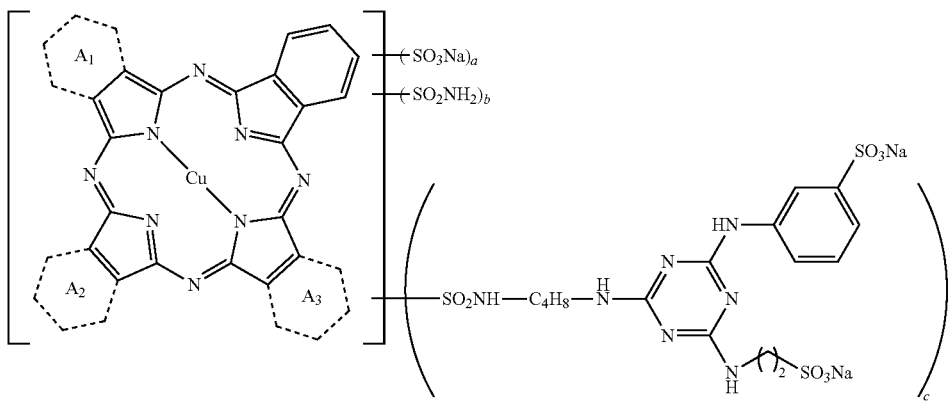

(1-B)

In the chemical formula (1-B),
rings $A_1$ and $A_2$ each independently represent a 2,3-pyridine ring or a 3,2-pyridine ring, and a ring $A_3$ represents a benzene ring; and
a is 2.4, b is 0.6, c is 1.0, and a, b, and c are average values in a mixture.

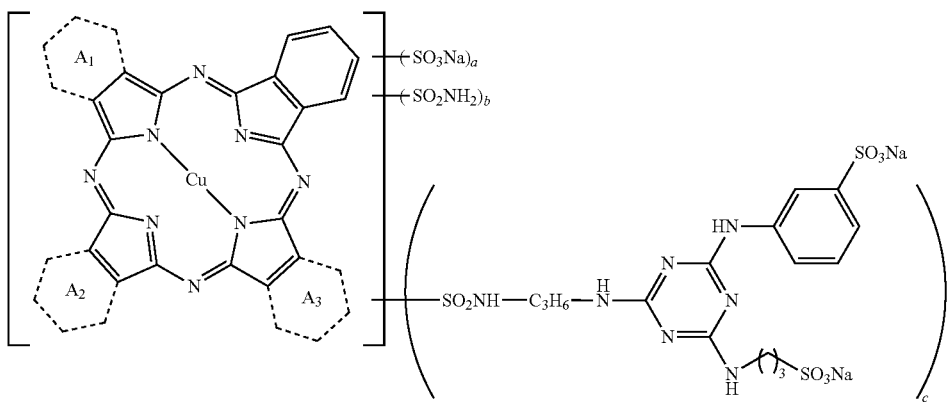

(1-C)

In the chemical formula (1-C),
rings $A_1$, $A_2$, and $A_3$ each independently represent a 2,3-pyridine ring or a 3,2-pyridine ring; and
a is 3.0, b is 0.2, c is 0.8, and a, b, and c are average values in a mixture.

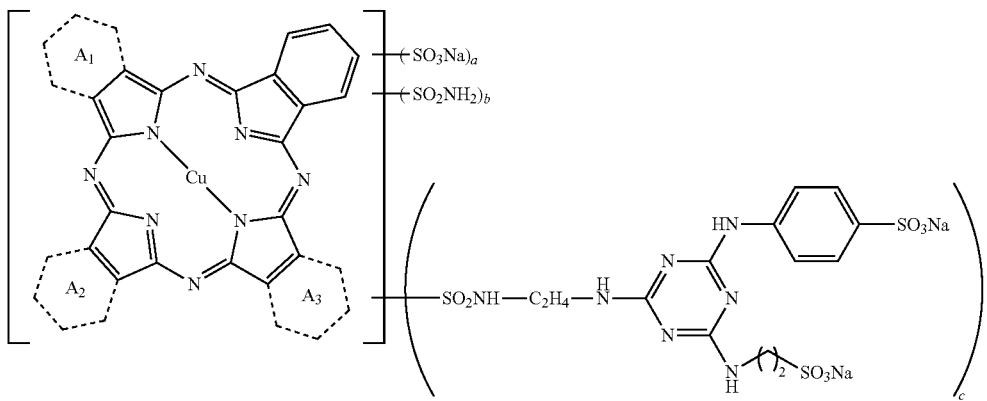

(1-D)

In the chemical formula (1-D),
a ring $A_1$ represents a benzene ring, and rings $A_2$ and $A_3$ each independently represent a 2,3-pyridine ring or a 3,2-pyridine ring; and
a is 1.8, b is 0.9, c is 1.3, and a, b, and c are average values in a mixture.

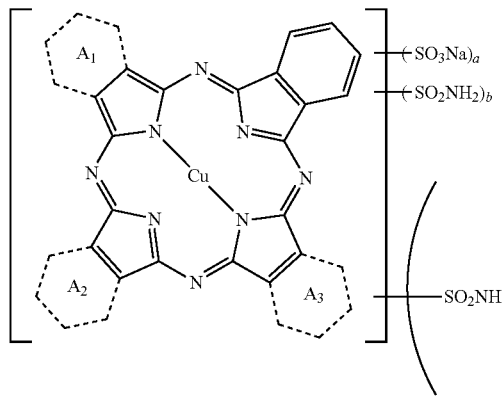

In the chemical formula (1-E),
rings $A_1$, $A_2$, and $A_3$ each independently represent a 2,3-pyridine ring or a 3,2-pyridine ring; and
a is 1.1, b is 1.3, c is 1.6, and a, b, and c are average values in a mixture.

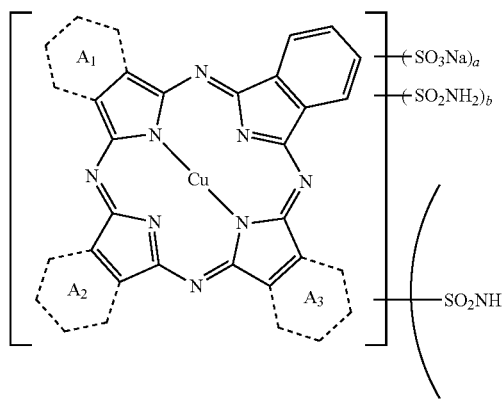

In the chemical formula (1-F),
rings $A_1$ and $A_3$ each independently represent a 2,3-pyridine ring or a 3,2-pyridine ring, and a ring $A_2$ represents a benzene ring; and
a is 0, b is 1.8, c is 2.2, and a, b, and c are average values in a mixture.

The dye (1) may be produced according to a conventionally known method. An example of the method for producing the dye (1) is as follows.

That is, first, a copper porphyrazine compound represented by the structural formula (11) is synthesized. The copper porphyrazine compound represented by the structural formula (11) is obtained, for example, by reaction of a nitrogen-containing heteroaromatic ring (at least one of a 2,3-pyridine ring and a 3,2-pyridine ring) dicarboxylic acid derivative and a phthalic acid derivative in the presence of a catalyst and a copper compound. By changing the molar ratio in the reaction of the nitrogen-containing heteroaromatic ring dicarboxylic acid derivative and the phthalic acid derivative, it is possible to adjust the number of nitrogen-containing heteroaromatic rings and the number of benzene rings in $A_1$, $A_2$, and $A_3$. As the nitrogen-containing heteroaromatic ring dicarboxylic acid derivative, for example, a 6-membered nitrogen-containing heteroaromatic ring dicarboxylic acid derivative having, at adjacent two positions, carboxyl groups or reactive groups derived therefrom (for example, an acid amide group, an imide group, an acid anhydride group, a carbonitrile group, and the like) is used. Examples of the method for synthesizing the copper porphyrazine compound include conventionally known methods such as the nitrile method, the Wyler method, and the like.

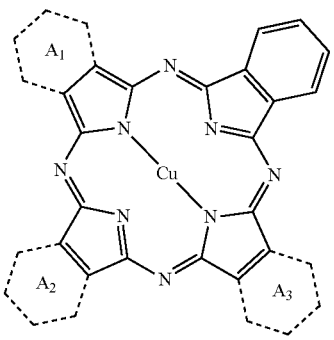

Next, a copper chlorosulfonylporphyrazine compound represented by the structural formula (12) is obtained by chlorosulfonation of the copper porphyrazine compound represented by the structural formula (11) in chlorosulfonic acid or by sulfonation of the copper porphyrazine compound represented by the structural formula (11) in sulfuric acid or fuming sulfuric acid followed by conversion of the sulfo group into a chlorosulfone group with a chlorinating agent.

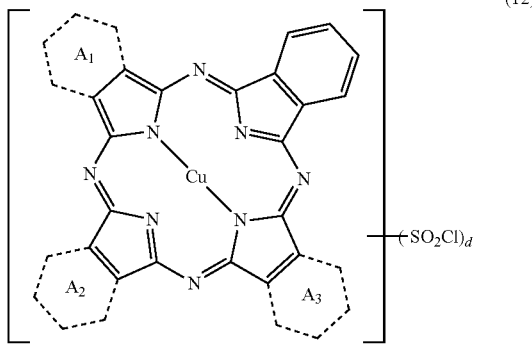

(12)

Next, the dye (1) is obtained by reaction of the thus obtained copper chlorosulfonylporphyrazine compound and organic amine represented by the structural formula (13) in the presence of an aminating agent (ammonia or an ammonia generating compound) in an aqueous solvent under reaction conditions in which the pH is from about 8 to about 10, the temperature is from about 5° C. to about 70° C., and the reaction time is from about 1 hour to about 20 hours. As the aminating agent, ammonia or a compound that generates ammonia at the time of the reaction (ammonia generating compound) may be used. Examples thereof include ammonium salts such as ammonium chloride, ammonium sulfate, and the like; urea; ammonia water; ammonia gas; and the like. In the organic amine represented by the structural formula (13), X and Y each represent a hydrogen atom or sodium. X and Y each may be ionized in the aqueous solvent (may become $H^+$ or $Na^+$). The organic amine may be produced by a conventionally known method.

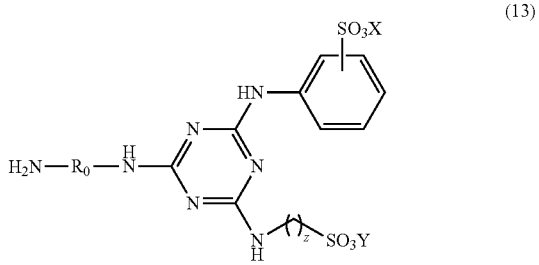

(13)

The thus obtained dye (1) may be separated by filtration or the like after aciding out or salting out. Salting out may be carried out, for example, under acidic to alkali conditions at a pH from about 1 to about 11. The temperature in salting out is not particularly limited, however is, for example, about 40° C. to about 80° C. and about 50° C. to about 70° C.

The dye (1) synthesized in the manner described above is obtained in a free acid form or a salt form thereof. The free acid form is obtained, for example, by aciding out. The salt form is obtained, for example, by salting out or by applying a typical salt exchange method of adding a desired organic or inorganic base to the free acid form.

The amount of the dye (1) to be added is not particularly limited. By adding the dye (1) to the water-based ink, ejection stability, ozone resistance, and light resistance may be improved. The amount of the dye (1) to be added relative to the amount of the water-based ink is, for example, about 0.1 wt % to about 10 wt %, about 1.4 wt % to about 5.7 wt %, and about 1.6 wt % to about 4.8 wt %.

As described above, the dye (2) is at least one dye selected from the group consisting of dyes represented by the general formula (2a), dyes represented by the general formula (2b), C. I. Direct Blue 199, and C. I. Direct Blue 86.

As described above, in the general formula (2a),

Pc (Cu) represents a copper phthalocyanine nucleus represented by the general formula (Pc);

$R_1$, $R_2$, $R_3$, and $R_4$ each represent a substituent selected from the group consisting of $-SO_2R_a$, $-SO_2NR_bR_c$, and $-CO_2R_a$, $R_1$, $R_2$, $R_3$, and $R_4$ are not all identical, at least one of $R_1$, $R_2$, $R_3$, and $R_4$ has an ionic hydrophilic group as a substituent, and at least one of $R_1$, $R_2$, $R_3$, and $R_4$ is present on any of the four benzene rings A, B, C, and D of the copper phthalocyanine nucleus represented by the general formula (Pc);

$R_a$ represents a substituted or unsubstituted alkyl group, $R_b$ represents a hydrogen atom or a substituted or unsubstituted alkyl group, and $R_c$ represents a substituted or unsubstituted alkyl group;

k satisfies $0<k<8$, l satisfies $0<l<8$, m satisfies $0 \leq m \leq 8$, n satisfies $0 \leq n \leq 8$, and k, l, m, and n satisfy $4 \leq k+l+m+n \leq 8$.

In the general formula (2a), the substituted or unsubstituted alkyl group may be a straight chain, branched chain or alicyclic alkyl group having 1 to 12 carbon atoms. The alkyl group may be the one having a branched chain, in particular, the one having an asymmetric carbon atom (in the form of a racemic body) from the view point of improving the solubility of the dye and the stability of the ink. Examples of the substituted or unsubstituted alkyl group include a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In the general formula (2a), examples of a substituent of the substituted alkyl group include a straight chain or branched chain alkyl group having 1 to 12 carbon atoms, such as a methyl group, an ethyl group, a propyl group, an isopropyl group, a sec-butyl group, a tert-butyl group, a 2-ethylhexyl group, a 2-methylsulfonyl ethyl group, a 3-phenoxy propyl group, a trifluoromethyl group, a cyclopentyl group, or the like; a straight chain or branched chain aralkyl group having 7 to 18 carbon atoms; a straight chain or branched chain alkenyl group having 2 to 12 carbon atoms; a straight chain or branched chain alkynyl group having 2 to 12 carbon atoms; a straight chain or branched chain cycloalkyl group having 3 to 12 carbon atoms; a straight chain or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-ditert-aminophenylgroup, or the like; a heterocyclic group such as an imidazolyl group, a pyrazolyl group, a triazolyl group, a 2-furil group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methanesulfonylethoxy group, or the like; an aryloxy group such as a phenoxy group, a 2-methylphenoxy group, a 4-tert-butylphenoxy group, a 3-nitrophenoxy group, a 3-tert-butoxycarbamoylphenoxy group, a 3-methoxycarbamoyl group, or the like; an acylamino group such as an acetamide group, a benzamide group, a 4-(3-tert-butyl-4-hydroxyphenoxy)butanamide group, or the like; an alkylamino group such as a methylamino group, a butylamino group, a diethylamino group, a methylbutylamino group, or the like; an anilino group such as a phenylamino group, a 2-chloroanilino group, or the like; an ureide group such as a phenylureide group, a methylureide group, an N,N-dibutylureide group, or the like; a sulfamoylamino group such as an N,N-dipropylsulfamoylamino group or the like; an alkylthio group such as a methylthio group, an octylthio group, a 2-phenoxyethylthio group, or the like; an arylthio group such as a phenylthio group, a 2-butoxy-5-tert-octylphenylthio group, a 2-carboxyphenylthio group, or the like; an alkoxycarbonylamino group such as a methoxycarbonylamino group or the like; a sulfonamide group such as a methanesulfonamide group, a benzenesulfonamide group, a p-toluenesulfonamide group, or the like; a carbamoyl group such as an N-ethylcarbamoyl group, an N,N-dibutylcarbamoyl group, or the like; a sulfamoyl group such as an N-ethylsulfamoyl group, an N,N-dipropylsulfamoyl group, an N-phenylsulfamoyl group or the like; a sulfonyl group such as a methanesulfonyl group, an octanesulfonyl group, a benzenesulfonyl group, a toluenesulfonyl group, or the like; an alkoxycarbonyl group such as a methoxycarbonyl group, a butoxycarbonyl group, or the like; a heterocyclic oxy group such as a 1-phenyltetrazole-5-oxy group, a 2-tetrahydroxypyranyloxy group, or the like; an azo group such as a phenylazo group, a 4-methoxyphenylazo group, a 4-pivaloylaminophenylazo group, a 2-hydroxy-4-propanoylphenylazo group, or the like; an acyloxy group such as an acetoxy group or the like; a carbamoyloxy group such as an N-methylcarbamoyloxy group, an N-phenylcarbamoyloxy group, or the like; a silyloxy group such as a trimethylsilyloxy group, a dibutylmethylsilyloxy group, or the like; an aryloxycarbonylamino group such as a phenoxycarbonlyamino group or the like; an imide group such as an N-succinimide group, an N-phthalimide group, or the like; a heterocyclic thio group such as a 2-benzothiazolylthio group, a 2,4-diphenoxy-1,3,5-triazole-6-thio group, a 2-pyridylthio group, or the like; a sulfinyl group such as a 3-phenoxypropylsulfinyl group or the like; a phosphonyl group such as a phenoxyphosphonyl group, an octyloxyphosphonyl group, a phenylphosphonyl group, or the like; an aryloxycarbonyl group such as a phenoxycarbonyl group or the like; an acyl group such as an acetyl group, a 3-phenylpropanoyl group, a benzoyl group, or the like; an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group as the substituent of the substituted alkyl group may be those having a branched chain, in particular, those having an asymmetric carbon atom, from the view point of improving the solubility of the dye and the stability of the ink.

Embodiment of the dye represented by the general formula (2a) is an embodiment where, for example, in the general formula (2a), $R_1$, $R_2$, $R_3$, and $R_4$ each represent $-SO_2R_a$; the respective $R_a$s in $R_1$, $R_2$, $R_3$, and $R_4$ are not all identical; and at least one of the $R_a$s is a substituted alkyl group having an ionic hydrophilic group.

Embodiment of the dye represented by the general formula (2a) is an embodiment where, for example, in the general formula (2a), k satisfies 0<k<4, l satisfies 0<l<4, m satisfies 0≦m<4, n satisfies 0≦n<4, and k, l, m, and n satisfy k+l+m+n=4.

Examples of the dye represented by the general formula (2a) include compounds represented by the following chemical formulae (2a-A) to (2a-E).

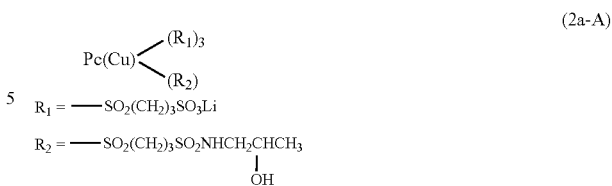

The compound represented by the chemical formula (2a-A) is an embodiment, where in the general formula (2a), $R_1$ is a lithium sulfonato propylsulfonyl group, $R_2$ is an N-(2-hydroxypropyl)sulfamoylpropylsulfonyl group, k is 3, l is 1, and m and n are both 0.

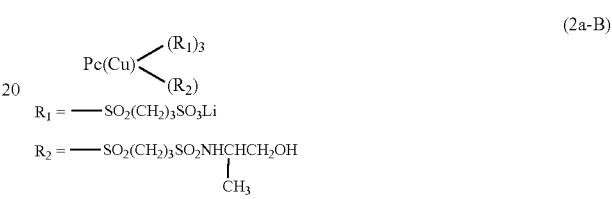

The compound represented by the chemical formula (2a-B) is another embodiment, where in the general formula (2a), $R_1$ is a lithium sulfonato propylsulfonyl group, $R_2$ is an N-(2-hydroxyisopropyl)sulfamoylpropylsulfonyl group, k is 3, l is 1, and m and n are both 0.

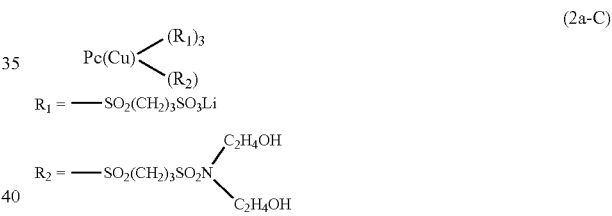

The compound represented by the chemical formula (2a-C) is still another embodiment, where in the general formula (2a), $R_1$ is a lithium sulfonato propylsulfonyl group, $R_2$ is an N,N-(di(2-hydroxyethyl))sulfamoylpropylsulfonyl group, k is 3, l is l, and m and n are both 0.

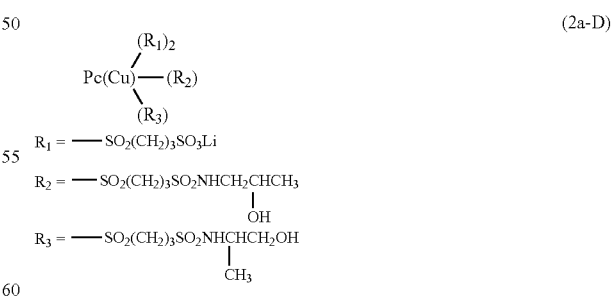

The compound represented by the chemical formula (2a-D) is yet another embodiment, where in the general formula (2a), $R_1$ is a lithium sulfonato propylsulfonyl group, $R_2$ is an N-(2-hydroxypropyl)sulfamoylpropylsulfonyl group, $R_3$ is an N-(2-hydroxyisopropyl)sulfamoylpropylsulfonyl group, k is 2, l is l, m is 1, and n is 0.

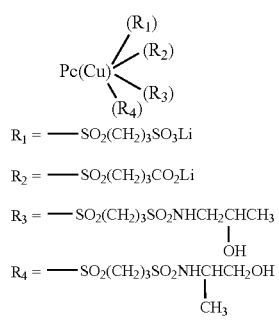

(2a-E)

$R_1 = -SO_2(CH_2)_3SO_3Li$ $R_2 = -SO_2(CH_2)_3CO_2Li$ $R_3 = -SO_2(CH_2)_3SO_2NHCH_2CHCH_3$
$\quad\quad\quad\quad\quad\quad\quad\quad\quad\quad\quad |$
$\quad\quad\quad\quad\quad\quad\quad\quad\quad\quad\quad OH$ $R_4 = -SO_2(CH_2)_3SO_2NHCHCH_2OH$
$\quad\quad\quad\quad\quad\quad\quad\quad\quad\quad\quad |$
$\quad\quad\quad\quad\quad\quad\quad\quad\quad\quad\quad CH_3$ The compound represented by the chemical formula (2a-E) is yet another embodiment, where in the general formula (2a), $R_1$ is a lithium sulfonato propylsulfonyl group, $R_2$ is a lithium carboxylate propylsulfonyl group, $R_3$ is an N-(2-hydroxypropyl)sulfamoylpropylsulfonyl group, $R_4$ is an N-(2-hydroxyisopropyl)sulfamoylpropylsulfonyl group, and k, l, m, and n are all 1.

Next, the method for producing the dye represented by the general formula (2a) is described. Generally, as described in JP2002-526589 A (WO00/17275), when an unsubstituted phthalocyanine compound is sulfonated, a sulfo group may be relatively easily introduced to its phthalocyanine nucleus by sulfonation. In the case where the sulfonated phthalocyanine compound is used as a water-soluble dye, for example, by salt-forming the sulfo group with an alkali metal hydroxide such as a sodium hydroxide, the resulting solfonate may be used as a dye as it is. In this case, there is a possibility that sulfonation occurs at any position of the phthalocyanine nucleus, in addition, the control of the number of sulfo groups to be introduced is difficult. Accordingly, when the sulfonation is carried out under reaction conditions in which the position and number of introduced sulfo groups are not taken into account but only the ease of sulfonation is taken into account, the position and number of the sulfo groups introduced into the product are difficult to identify, and a mixture of compounds different in the number and position of the substituents may be obtained. Therefore, to improve the ozone resistance of the dye represented by the general formula (2a), it is preferable that an ozone resistance-inferior product is prevented from being mixed. Thus, it is preferable to introduce a specific substituent to a phthalic acid derivative in advance and to synthesize copper phthalocyanine from the thus obtained substituted phthalic acid derivative and a copper derivative such as CuCl₂ or the like. A method for synthesizing copper phthalocyanine from a phthalic acid derivative and a copper derivative is described, for example, in JP2000-303009 A.

The method for producing the dye represented by the general formula (2a) is, for example, as follows. It is to be noted that the substituted phthalic acid derivative may be produced, for example, by the following reaction scheme.

As a phthalic acid derivative serving as a raw material, for example, substituted phthalonitrile, substituted diiminoisoindoline, substituted phthalic diamide, substituted phthalimide, substituted phthalic acid and its salt, substituted phthalic anhydride, and the like may be employed.

A substituent of the substituted phthalic acid derivative is a soluble group or its precursor. The soluble group is a substituent that imparts solubility to a copper phthalocyanine dye. When a soluble group imparts water solubility to a copper phthalocyanine dye, the soluble group is a hydrophilic group. Examples of the hydrophilic group include an ionic hydrophilic group and a substituent substituted by an ionic hydrophilic group. The precursor of the soluble group is a substituent that is capable of being converted into a soluble group through a reaction after a phthalocyanine ring is formed. As a substituent of the substituted phthalic acid derivative, a substituent selected from the group consisting of $-SO_2R_a$, $-SO_2NR_bR_c$, and $-CO_2R_a$ may be used. $R_a$ represents a substituted or unsubstituted alkyl group, $R_b$ represents a hydrogen atom or a substituted or unsubstituted alkyl group, and $R_c$ represents a substituted or unsubstituted alkyl group.

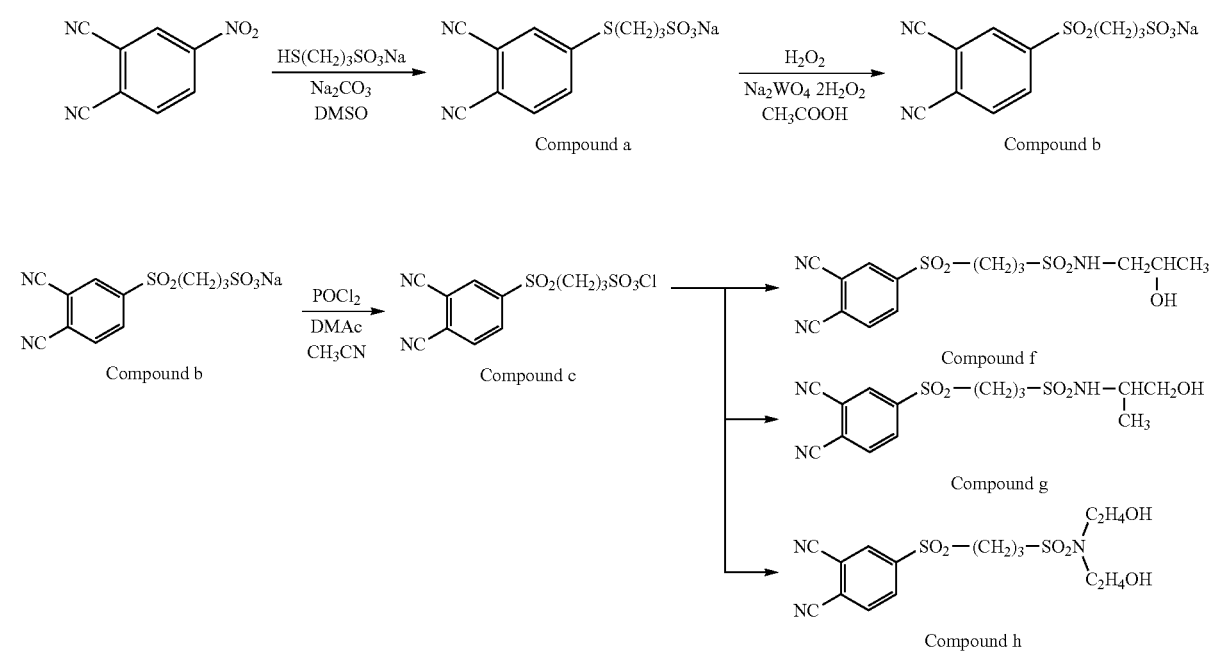

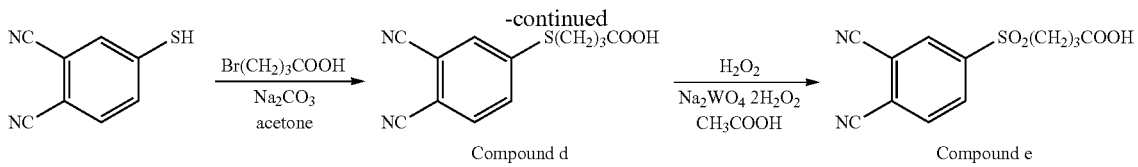

Compound d        Compound e

Next, the phthalic acid derivatives typified by the aforementioned compounds a to h and a copper derivative such as $CuCl_2$ or the like are mixed at a molar ratio (copper derivative: phthalic acid derivative) of about 3:1 to about 6:1, and reacted at a temperature in the range from about 80° C. to about 300° C. in the presence of an organic solvent having the boiling point of, for example, about 80° C. or higher and about 130° C. or higher. By setting the reaction temperature in the aforementioned range, extreme slow down of a reaction speed and decomposition of the phthalocyanine dye to be obtained are prevented. The time for the reaction is, for example, about 2 hours to about 20 hours. By setting the reaction time in the aforementioned range, large amount of materials are prevented from being unreacted and the phthalocyanine dye is prevented from being decomposed. The reaction may be carried out in the presence of a catalyst such as 1,8-diazabicyclo[5.4.0]-7-undecene(DBU), ammonium molybdate, or the like. Then, an ion-exchange is carried out, for example, according to the following method: the original cation is removed through dialysis; and then a monovalent metal cation is added (for example, an alkali metal hydroxide is added). After completion of the reaction, the reaction product is treated according to an ordinary aftertreatment for an organic synthesis reaction, whereby the dye represented by the general formula (2a) having higher ozone resistance is obtained.

As described above, in the general formula (2b),

Pc (Cu) represents a copper phthalocyanine nucleus represented by the general formula (Pc);

M represents lithium, sodium, potassium, or ammonium;

x satisfies $0<x<4$, y satisfies $0<y<4$, and x and y satisfy $2 \leq x+y \leq 5$; a $SO_3M$ group and a $SO_2NH_2$ group are present on any of the four benzene rings A, B, C, and D of the copper phthalocyanine nucleus represented by the general formula (Pc).

The M may be ionized in a water-based ink (any of $Li^+$, $Na^+$, $K^+$, and $NH_4^+$). With respect to the water-based ink for ink-jet recording, in the general formula (2b), x and y may satisfy $x+y=4$.

Examples of the dye represented by the general formula (2b) include compounds represented by the following chemical formulae (2b-A) to (2b-D).

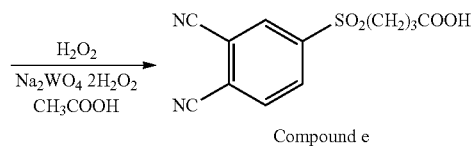

(2b-A)

The compound represented by the chemical formula (2b-A) is an embodiment, where in the general formula (2b), M is sodium, x is 1, y is 3, and a substituent is present on each of the four benzene rings A, B, C, and D of the copper phthalocyanine nucleus represented by the general formula (Pc).

(2b-B)

The compound represented by the chemical formula (2b-B) is another embodiment, where in the general formula (2b), M is sodium, x is 2, y is 2, and a substituent is present on each of the four benzene rings A, B, C, and D of the copper phthalocyanine nucleus represented by the general formula (Pc).

(2b-C)

The compound represented by the chemical formula (2b-C) is still another embodiment, where in the general formula (2b), M is sodium, x is 3, y is 1, and a substituent is present on each of the four benzene rings A, B, C, and D of the copper phthalocyanine nucleus represented by the general formula (Pc).

(2b-D)

The compound represented by the chemical formula (2b-D) is yet another embodiment, where in the general formula (2b), M is ammonium, x is 1, y is 3, and a substituent is present on each of the four benzene rings A, B, C, and D of the copper phthalocyanine nucleus represented by the general formula (Pc).

The dye represented by the general formula (2b) may be produced, for example, by a conventionally known copper phthalocyanine substitution method having, for example, the following steps (A) to (C).

Step (A)

First, a copper phthalocyanine compound is chlorosulfonated with a chlorosulfonating agent. Examples of the chlorosulfonating agent include a mixture of a chlorosulfonic acid and a chlorinating agent (phosphorous oxychloride or phosphorous trichloride); and the like. The molar ratio of the chlorosulfonic acid to the copper phthalocyanine compound (chlorosulfonic acid:copper phthalocyanine compound) is, for example, about 5:1 to about 200:1. The molar ratio of the chlorinating agent to the copper phthalocyanine compound (chlorinating agent:copper phthalocyanine compound) is, for example, about 0.5:1 to about 10:1.

This chlorosulfonation reaction is carried out, for example, at a temperature from about 90° C. to about 180° C. for about 0.5 hours to about 16 hours. Generally, the reaction time for the chlorosulfonation depends on the reaction temperature.

The reaction time tends to be short as the reaction temperature is increased, and the reaction time tends to be long as the reaction temperature is decreased. The chlorosulfonation reaction may be carried out at a temperature from about 135° C. to about 145° C. for about 1.5 hours to about 5.0 hours.

The chlorosulfonating agent may contain a sulfuric acid. When the chlorosulfonating agent contains a sulfuric acid, the molar ratio of the sulfuric acid to the copper phthalocyanine compound (sulfuric acid:copper phthalocyanine compound) is about 0.3:1 to about 2:1.

Step (B)

Next, a compound represented by the structural formula (21) is obtained by condensation reaction of the product obtained in the step (A) and ammonia.

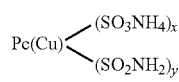
(21)

This step is carried out at a reaction temperature from about 0° C. to about 50° C. using about 3 wt % to about 35 wt % of ammonium hydroxide. Generally, the reaction time depends on the reaction temperature. The reaction time tends to be short as the reaction temperature is increased, and the reaction time tends to be long as the reaction temperature is decreased. The condensation reaction may be carried out at a temperature from about 0° C. to about 45° C. for about 0.5 hours to about 24 hours.

Step (C)

Then, $NH_4^+$ in the compound represented by the structural formula (21) obtained in the step (B) is exchanged with a monovalent metal cation, if necessary. This metal cation exchange reaction may be carried out, for example, by the following method: the product obtained in the step (B) is acidified (for example, $NH_4^+$ is exchanged with $H^+$ using a hydrochloric acid), then the original cation is removed through dialysis, and then a monovalent metal cation is added (for example, an alkali metal hydroxide is added). In this manner, the dye represented by the general formula (2b) is produced.

The C. I. Direct Blue 86 used for the dye (2) is, for example, a dye represented by the structural formula (2c).

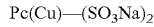
(2c)

In the structural formula (2c),

Pc (Cu) represents a copper phthalocyanine nucleus represented by the general formula (Pc); and a $SO_3Na$ group is present on any of the four benzene rings A, B, C, and D of the copper phthalocyanine nucleus represented by the general formula (Pc).

The amount of the dye (2) to be added is not particularly limited. By adding the dye (2) to the water-based ink, improvement of color developing properties and reduction of bronzing may be achieved. Further, when the dye (2) contains the dye represented by the general formula (2a), ozone resistance and light resistance may be improved. The amount of the dye (2) to be added relative to the amount of the water-based ink is, for example, about 0.05 wt % to about 5 wt %, about 0.1 wt % to about 1.8 wt %, and about 0.25 wt % to about 1.5 wt %.

The weight ratio of the dye (1) to the dye (2) in the water-based ink may be about 70:30 to about 95:5 (dye (1):dye (2)). By setting the weight ratio in the aforementioned range, a water-based ink that is excellent in color developing properties, ozone resistance, and light resistance and that achieves reduction of bronzing is obtained.

The total amount of the dye (1) and the dye (2) to be added it not particularly limited. The total amount of the dye (1) and the dye (2) to be added relative to the amount of the water-based ink may be about 2 wt % to about 6 wt %. By setting the total amount of the dye (1) and the dye (2) to be added in the aforementioned range, a water-based ink that is excellent in ejection stability, color developing properties, ozone resistance, and light resistance and that achieves reduction of bronzing is obtained.

In addition to the dye (1) and the dye (2), the coloring agent may further contain other dyes and pigments.

The water may be ion-exchange water or pure water. The amount of the water to be added (the proportion of the water in the water-based ink) relative to the amount of the water-based ink is, for example, about 10 wt % to about 90 wt %, and about 40 wt % to about 80 wt %. Alternatively, the amount of the water to be added may be, for example, the balance of the ink, excluding other components.

Examples of the water-soluble organic solvent include a humectant and a penetrant. The humectant prevents a water-based ink from drying at a nozzle tip portion of an ink-jet head, for example. The penetrant adjusts a drying rate of a water-based ink on a recording medium, for example.

The humectant is not particularly limited, and examples thereof include lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone, and the like; ketoalcohols such as diacetone alcohol, and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like. Examples of the polyalkylene glycol include polyethylene glycol, polypropylene glycol, and the like. Examples of the alkylene glycol include ethylene glycol, propylene glycol, butylene glycol, diethylene glycol, triethylene glycol, dipropylene glycol, tripropylene glycol, thiodiglycol, hexylene glycol, and the like. One of the humectants may be used alone or two r more of them may be used in combination. Among them, for example, the humectant may be polyalcohols such as alkylene glycol, glycerin, and the like.

The amount of the humectant to be added relative to the amount of the water-based ink is, for example, 0 wt % to about 95 wt %, about 5 wt % to about 80 wt %, and about 5 wt % to about 50 wt %.

An example of the penetrant includes glycol ether. Examples of the glycol ether include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added relative to the amount of the water-based ink is, for example, 0 wt % to about 20 wt %, about 0.1 wt % to about 15 wt %, and about 0.5 wt % to about 10 wt %.

The water-based ink may further comprise a conventionally known additive(s), if necessary. Examples of the additive include a surfactant, a pH adjuster, a viscosity modifier, a surface tension modifier, a mildewproofing agent, and the like. Examples of the viscosity modifier include polyvinyl alcohol, cellulose, a water-soluble resin, and the like.

The water-based ink may be prepared, for example, by uniformly mixing the coloring agent, water, the water-soluble organic solvent, and optionally other added components by a conventionally known method, and then removing sediments with a filter or the like.

The water-based ink may be used, for example, as a water-based cyan ink. The water-based ink may be used as a water-based ink of other than cyan by using a coloring agent other than the dye (1) and the dye (2).

Next, the ink cartridge is described. The ink cartridge contains a water-based ink for ink-jet recording, and the water-based ink is the aforementioned water-based ink for ink-jet recording. As a body of the ink cartridge, for example, a conventionally known body may be used.

Next, the ink-jet recording apparatus is described. The ink-jet recording apparatus comprises an ink storing portion and an ink ejecting unit, and an ink stored in the ink storing portion is ejected by the ink ejecting unit. The ink cartridge is stored in the ink storing portion. Except for this, the ink-jet recording apparatus may have a configuration similar to that of a conventionally known ink-jet recording apparatus, for example.

As shown in FIG. 1, an ink-jet recording apparatus 1 comprises four ink cartridges 2, an ink ejecting unit (ink-jet head) 3, a head unit 4, a carriage 5, a drive unit 6, a platen roller 7, and a purge unit 8 as main components.

The four ink cartridges 2 contain water-based inks of four colors, namely, yellow, magenta, cyan, and black, respectively. For example, an ink cartridge containing the water-based cyan ink is the aforementioned ink cartridge. The ink-jet head 3 performs recording on a recording medium P such as a recording paper. The head unit 4 is provided with the ink-jet head 3. The four ink cartridges 2 and the head unit 4 are mounted on the carriage 5. The drive unit 6 reciprocates the carriage 5 in a straight line. As the drive unit 6, a conventionally known drive unit may be used (see JP 2008-246821 A, for example). The platen roller 7 extends in the reciprocating direction of the carriage 5 and is arranged so as to face to the ink-jet head 3. The recording includes recording of letters and images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, a predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor inks containing, for example, air bubbles trapped inside the ink-jet head 3. As the purge unit 8, a conventionally known purge unit may be used (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers a plurality of nozzles of the ink-jet head 3, which returns to the reset position after completion of the recording, in order to prevent the inks from drying.

In the ink-jet recording apparatus, the four ink cartridges may be mounted on a plurality of carriages. Alternatively, the four ink cartridges may not be mounted on the carriage, but may be arranged and fixed in the ink-jet recording apparatus. In such an embodiment, for example, the ink cartridges are connected to the head unit mounted on the carriage via a tube or the like, and the inks are supplied to the head unit from the ink cartridges.

Next, a method for ink-jet recording with the water-based ink for ink-jet recording is described. The method for ink-jet recording performs recording with a water-based ink for ink-jet recording. The water-based ink comprises a coloring agent, water, and a water-soluble organic solvent. The coloring agent comprises the dye (1) and the dye (2). The method for ink-jet recording may be performed using the ink-jet recording apparatus shown in FIG. 1.

In the method for ink-jet recording, the weight ratio of the dye (1) to the dye (2) in the water-based ink may be about 70:30 to about 95:5 (dye (1):dye (2)).

In the method for ink-jet recording, the total amount of the dye (1) and the dye (2) relative to the amount of the water-based ink may be about 2 wt % to about 6 wt %.

EXAMPLES

Next, Examples are described together with Comparative Examples. However, the present invention is neither limited nor restricted by the following Examples or Comparative Examples.

Examples 1 to 55 and Comparative Examples 1 to 15

Water-based inks for ink-jet recording of Examples 1 to 55 and Comparative Examples 1 to 15 were obtained by mixing their ink composition components (Tables 1 to 6) uniformly and then filtering each of the resultant mixtures through a hydrophilic polytetrafluoroethylene (PTFE) type membrane filter (pore diameter: 0.20 µm) manufactured by Toyo Roshi Kaisha, Ltd. In Tables 1 to 6 below, dyes (1-A) to (1-F) are compounds represented by the chemical formulae (1-A) to (1-F), respectively, dyes (2a-A) to (2a-E) are compounds represented by the chemical formulae (2a-A) to (2a-E), respectively, and dyes (2b-A) to (2b-C) are compounds represented by the chemical formulae (2b-A) to (2b-C), respectively.

With respect to each of the water-based inks of Examples and Comparative Examples, (a) evaluation of ejection stability, (b) evaluation of color developing properties, (c) evaluation of bronzing, (d) evaluation of ozone resistance, (e) evaluation of light resistance, and (f) comprehensive evaluation were made according to the following methods. Samples used for (b) evaluation of color developing properties, (c) evaluation of bronzing, (d) evaluation of ozone resistance, and (e) evaluation of light resistance were prepared in the following manner.

First, ink cartridges were filled with the water-based inks of Examples and Comparative Examples, respectively. Next, each of the ink cartridges was attached to a digital multi-function center DCP-385C mounted an ink-jet printer manufactured by Brother Industries, Ltd. Then, each of the gradation samples of the water-based inks was printed on a glossy photo paper BP71GA manufactured by Brother Industries, Ltd.

(a) Evaluation of Ejection Stability

Continuous recording of 100 million dots (approximately 30,000 sheets) was carried out on office paper W (recording paper) manufactured by FUJITSU CoWorCo LIMITED using the digital multi-function center DCP-385C. The result of the continuous recording was evaluated according to the following evaluation criteria. The term "non-ejection" denotes the state where the nozzle of the ink-jet head is clogged and the water-based ink is not ejected. The term "ejection deflection" denotes the state where the nozzle of the ink-jet head is partially clogged and thereby the water-based ink is ejected not perpendicularly to the recording paper but obliquely thereto.

Criteria for Ejection Stability Evaluation

A: Neither non-ejection nor ejection deflection occurred during the continuous recording.

B: Non-ejection and/or ejection deflection occurred to a small extent during the continuous recording but the non-ejection and/or ejection deflection was restored by five purges or fewer.

C: Non-ejection and/or ejection deflection occurred to a large extent during the continuous recording and the non-ejection and/or ejection deflection was not restored by five purges.

(b) Evaluation of Color Developing Properties

Each of the gradation samples was visually observed and evaluated whether or not the cyan color was sufficiently developed according to the following evaluation criteria.

Criteria for Color Developing Properties Evaluation

A: cyan color was sufficiently developed.

C: cyan color was not developed.

(c) Evaluation of Bronzing

Each of the gradation samples was visually observed and evaluated whether or not bronzing occurred according to the following evaluation criteria.

Criteria for Bronzing Evaluation

A: No bronzing was observed at all.

B: Bronzing was observed to a small extent but was an acceptable level in practical use.

C: Marked bronzing was observed.

(d) Evaluation of Ozone Resistance

Among the gradation samples, a patch having an initial OD value of 1.0 was used as an evaluation patch. The OD value was measured with a spectrophotometer, Spectrolino (light source: $D_{65}$; observer: 2°; and status A), manufactured by GretagMacbeth. Using an ozone weather meter, OMS-H, manufactured by SUGA TEST INSTRUMENTS CO., LTD, the patch was allowed to stand for 40 hours under the conditions in which the ozone concentration was 1 ppm, the temperature in the bath was 24° C., and the relative humidity in the bath was 60%. Next, the OD value of the patch after being allowed to stand was measured in the same manner as described above. Then, the OD value decrease rate (%) was determined according to the following equation (I), and the ozone resistance was evaluated according to the following evaluation criteria. The smaller the OD value decrease rate, the less the deterioration in image quality, which means the ozone resistance of the water-based ink is higher.

$$\text{OD value decrease rate (\%)} = \{(X-Y)/X\} \times 100 \quad (I)$$

X: 1.0 (initial OD value)

Y: OD value after being allowed to stand

Criteria for Ozone Resistance Evaluation

A: OD value decrease rate was not more than 20%.

B: OD value decrease rate was 20% or more but not more than 30%.

C: OD value decrease rate was 30% or more but not more than 40%.

D: OD value decrease rate was 40% or more.

(e) Evaluation of Light Resistance

Among the gradation samples, a patch having an initial OD value of 1.0 was used as an evaluation patch. The OD value was measured with a spectrophotometer, Spectrolino (light source: $D_{65}$; observer: 2°; and status A), manufactured by GretagMacbeth. Using a super xenon weather meter, SX75, manufactured by SUGA TEST INSTRUMENTS CO., LTD, the patch was irradiated with light from a xenon lamp for 100 hours under the conditions in which the temperature in the bath was 23° C., the relative humidity in the bath was 50%, and the illuminance was 81 klx. Next, the OD value of the patch after irradiation was measured in the same manner as described above. Then, the OD value decrease rate (%) was determined according to the following equation (II), and the light resistance was evaluated according to the following evaluation criteria. The smaller the OD value decrease rate, the less the deterioration in image quality, which means the light resistance of the water-based ink is higher.

$$\text{OD value decrease rate (\%)} = \{(X-Y)/X\} \times 100 \quad (II)$$

X: 1.0 (initial OD value)

Y: OD value after irradiation

Criteria for Light Resistance Evaluation

A: OD value decrease rate was not more than 20%.

B: OD value decrease rate was 20% or more but not more than 30%.

C: OD value decrease rate was 30% or more but not more than 40%.

D: OD value decrease rate was 40% or more.

(f) Comprehensive Evaluation

With respect to the water-based inks of Examples and Comparative Examples, the comprehensive evaluation was made according to the following evaluation criteria based on the results of the evaluations (a) to (e).

Criteria for Comprehensive Evaluation

G: All of the evaluation results were A or B.

NG: The evaluation results contain C and/or D.

The ink compositions and the evaluation results of the water-based inks of Examples and Comparative Examples are summarized in Tables 1 to 6.

TABLE 1

|  |  |  |  | Ex. 1 | Ex. 2 | Ex. 3 | Ex. 4 | Ex. 5 | Ex. 6 | Ex. 7 |
|---|---|---|---|---|---|---|---|---|---|---|
| Ink composition (wt %) | Coloring agent | Dye (1) | Dye (1-A) | 4.0 | — | — | — | — | 3.0 | 3.5 |
|  |  |  | Dye (1-B) | — | 4.0 | — | — | — | — | — |
|  |  |  | Dye (1-C) | — | — | 4.0 | — | — | — | — |
|  |  |  | Dye (1-D) | — | — | — | 3.75 | — | — | — |
|  |  |  | Dye (1-E) | — | — | — | — | 4.5 | — | — |

TABLE 1-continued

|  |  |  |  |  |  |  |  |  |  |
|---|---|---|---|---|---|---|---|---|---|
|  |  | Dye (2) | Dye (2a-A) | 1.0 | — | — | — | — | 2.0 | 1.5 |
|  |  |  | Dye (2a-B) | — | 1.0 | — | — | — | — | — |
|  |  |  | Dye (2a-C) | — | — | 1.0 | — | — | — | — |
|  |  |  | Dye (2a-D) | — | — | — | 1.25 | — | — | — |
|  |  |  | Dye (2a-E) | — | — | — | — | 0.5 | — | — |
|  | Glycerin |  |  | 15.0 | 15.0 | 15.0 | 15.0 | 15.0 | 15.0 | 15.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 80:20 | 80:20 | 80:20 | 75:25 | 90:10 | 60:40 | 70:30 |
|  | Total amount of dyes in ink (wt %) |  |  | 5.0 | 5.0 | 5.0 | 5.0 | 5.0 | 5.0 | 5.0 |
| Evaluation | Ejection stability evaluation |  |  | A | A | A | A | A | B | A |
|  | Color developing properties evaluation |  |  | A | A | A | A | A | A | A |
|  | Bronzing evaluation |  |  | A | A | A | A | A | A | A |
|  | Ozone resistance evaluation |  |  | A | A | A | A | A | A | A |
|  | Light resistance evaluation |  |  | A | A | A | A | A | A | A |
|  | Comprehensive evaluation |  |  | G | G | G | G | G | G | G |

|  |  |  |  | Ex. 8 | Ex. 9 | Ex. 10 | Ex. 11 | Ex. 12 | Ex. 13 |
|---|---|---|---|---|---|---|---|---|---|
| Ink composition (wt %) | Coloring agent | Dye (1) | Dye (1-A) | 4.75 | 4.9 | — | — | — | — |
|  |  |  | Dye (1-B) | — | — | 0.8 | 1.6 | 4.8 | 5.6 |
|  |  |  | Dye (1-C) | — | — | — | — | — | — |
|  |  |  | Dye (1-D) | — | — | — | — | — | — |
|  |  |  | Dye (1-E) | — | — | — | — | — | — |
|  |  | Dye (2) | Dye (2a-A) | 0.25 | 0.1 | — | — | — | — |
|  |  |  | Dye (2a-B) | — | — | 0.2 | 0.4 | 1.2 | 1.4 |
|  |  |  | Dye (2a-C) | — | — | — | — | — | — |
|  |  |  | Dye (2a-D) | — | — | — | — | — | — |
|  |  |  | Dye (2a-E) | — | — | — | — | — | — |
|  | Glycerin |  |  | 15.0 | 15.0 | 20.0 | 20.0 | 13.0 | 12.0 |
|  | Polyethylene glycol # 200 |  |  | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 |
|  | Water |  |  | Balance | Balance | Balance | Balance | Balance | Balance |
| Ink | Dye (1):Dye (2) (weight ratio) |  |  | 95:5 | 98:2 | 80:20 | 80:20 | 80:0 | 80:20 |
|  | Total amount of dyes in ink (wt %) |  |  | 5.0 | 5.0 | 1.0 | 2.0 | 6.0 | 7.0 |
| Evaluation | Ejection stability evaluation |  |  | A | A | A | A | A | B |
|  | Color developing properties evaluation |  |  | A | A | A | A | A | A |
|  | Bronzing evaluation |  |  | A | B | A | A | A | B |
|  | Ozone resistance evaluation |  |  | A | A | B | A | A | A |
|  | Light resistance evaluation |  |  | A | A | A | A | A | A |
|  | Comprehensive evaluation |  |  | G | G | G | G | G | G |

(*1): Acetylene glycol surfactant (ethylene oxide adduct (10 mol) of diol, Nissin Chemical Industry Co., Ltd.)

TABLE 2

|  |  |  |  | Ex. 14 | Ex. 15 | Ex. 16 | Ex. 17 | Ex. 18 | Ex. 19 | Ex. 20 |
|---|---|---|---|---|---|---|---|---|---|---|
| Ink composition (wt %) | Coloring agent | Dye (1) | Dye (1-A) | 4.0 | — | — | — | — | — | 3.0 |
|  |  |  | Dye (1-B) | — | 4.0 | — | — | — | — | — |
|  |  |  | Dye (1-C) | — | — | 4.0 | — | — | — | — |
|  |  |  | Dye (1-D) | — | — | — | 3.75 | — | — | — |
|  |  |  | Dye (1-E) | — | — | — | — | 4.5 | — | — |
|  |  |  | Dye (1-F) | — | — | — | — | — | 4.0 | — |
|  |  | Dye (2) | Dye (2b-A) | 1.0 | — | — | 1.25 | — | — | 2.0 |
|  |  |  | Dye (2b-B) | — | 1.0 | — | 0.5 | — | — |
|  |  |  | Dye (2b-C) | — | — | 1.0 | — | — | 1.0 | — |
|  | Glycerin |  |  | 15.0 | 15.0 | 15.0 | 15.0 | 15.0 | 15.0 | 15.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 80:20 | 80:20 | 80:20 | 75:25 | 90:10 | 80:20 | 60:40 |
|  | Total amount of dyes in ink (wt %) |  |  | 5.0 | 5.0 | 5.0 | 5.0 | 5.0 | 5.0 | 5.0 |
| Evaluation | Ejection stability evaluation |  |  | A | A | A | A | A | A | A |
|  | Color developing properties evaluation |  |  | A | A | A | A | A | A | A |
|  | Bronzing evaluation |  |  | A | A | A | A | A | A | A |
|  | Ozone resistance evaluation |  |  | A | A | A | A | A | A | B |
|  | Light resistance evaluation |  |  | A | A | A | A | A | A | A |
|  | Comprehensive evaluation |  |  | G | G | G | G | G | G | G |

TABLE 2-continued

|  |  |  |  | Ex. 21 | Ex. 22 | Ex. 23 | Ex. 24 | Ex. 25 | Ex. 26 | Ex. 27 |
|---|---|---|---|---|---|---|---|---|---|---|
| Ink composition (wt %) | Coloring agent | Dye (1) | Dye (1-A) | 3.5 | 4.75 | 4.9 | — | — | — | — |
|  |  |  | Dye (1-B) | — | — | — | 0.8 | 1.6 | 4.8 | 5.6 |
|  |  |  | Dye (1-C) | — | — | — | — | — | — | — |
|  |  |  | Dye (1-D) | — | — | — | — | — | — | — |
|  |  |  | Dye (1-E) | — | — | — | — | — | — | — |
|  |  |  | Dye (1-F) | — | — | — | — | — | — | — |
|  |  | Dye (2) | Dye (2b-A) | 1.5 | 0.25 | 0.1 | — | — | — | — |
|  |  |  | Dye (2b-B) | — | — | — | 0.2 | 0.4 | 1.2 | 1.4 |
|  |  |  | Dye (2b-C) | — | — | — | — | — | — | — |
|  | Glycerin |  |  | 15.0 | 15.0 | 15.0 | 20.0 | 20.0 | 13.0 | 12.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 70:30 | 95:5 | 98:2 | 80:20 | 80:20 | 80:20 | 80:20 |
|  | Total amount of dyes in ink (wt %) |  |  | 5.0 | 5.0 | 5.0 | 1.0 | 2.0 | 6.0 | 7.0 |
| Evaluation | Ejection stability evaluation |  |  | A | A | A | A | A | A | B |
|  | Color developing properties evaluation |  |  | A | A | A | A | A | A | A |
|  | Bronzing evaluation |  |  | A | A | B | A | A | A | B |
|  | Ozone resistance evaluation |  |  | A | A | A | B | A | A | A |
|  | Light resistance evaluation |  |  | A | A | A | A | A | A | A |
|  | Comprehensive evaluation |  |  | G | G | G | G | G | G | G |

(*1): Acetylene glycol surfactant (ethylene oxide adduct (10 mol) of diol, Nissin Chemical Industry Co., Ltd.)

TABLE 3

|  |  |  |  | Ex. 28 | Ex. 29 | Ex. 30 | Ex. 31 | Ex. 32 | Ex. 33 | Ex. 34 |
|---|---|---|---|---|---|---|---|---|---|---|
| Ink composition (wt %) | Coloring agent | Dye (1) | Dye (1-A) | 4.0 | — | — | — | — | — | 3.0 |
|  |  |  | Dye (1-B) | — | 4.0 | — | — | — | — | — |
|  |  |  | Dye (1-C) | — | — | 4.0 | — | — | — | — |
|  |  |  | Dye (1-D) | — | — | — | 3.75 | — | — | — |
|  |  |  | Dye (1-E) | — | — | — | — | 4.5 | — | — |
|  |  |  | Dye (1-F) | — | — | — | — | — | 4.0 | — |
|  |  | Dye (2) | C.I. Direct Blue 199 | 1.0 | 1.0 | 1.0 | 1.25 | 0.5 | 1.0 | 2.0 |
|  | Glycerin |  |  | 15.0 | 15.0 | 15.0 | 15.0 | 15.0 | 15.0 | 15.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 80:20 | 80:20 | 80:20 | 75:25 | 90:10 | 80:20 | 60:40 |
|  | Total amount of dyes in ink (wt %) |  |  | 5.0 | 5.0 | 5.0 | 5.0 | 5.0 | 5.0 | 5.0 |
| Evaluation | Ejection stability evaluation |  |  | A | A | A | A | A | A | A |
|  | Color developing properties evaluation |  |  | A | A | A | A | A | A | A |
|  | Bronzing evaluation |  |  | A | A | A | A | A | A | A |
|  | Ozone resistance evaluation |  |  | A | A | A | A | A | A | B |
|  | Light resistance evaluation |  |  | A | A | A | A | A | A | A |
|  | Comprehensive evaluation |  |  | G | G | G | G | G | G | G |

|  |  |  |  | Ex. 35 | Ex. 36 | Ex. 37 | Ex. 38 | Ex. 39 | Ex. 40 | Ex. 41 |
|---|---|---|---|---|---|---|---|---|---|---|
| Ink composition (wt %) | Coloring agent | Dye (1) | Dye (1-A) | 3.5 | 4.75 | 4.9 | — | — | — | — |
|  |  |  | Dye (1-B) | — | — | — | 0.8 | 1.6 | 4.8 | 5.6 |
|  |  |  | Dye (1-C) | — | — | — | — | — | — | — |
|  |  |  | Dye (1-D) | — | — | — | — | — | — | — |
|  |  |  | Dye (1-E) | — | — | — | — | — | — | — |
|  |  |  | Dye (1-F) | — | — | — | — | — | — | — |
|  |  | Dye (2) | C.I. Direct Blue 199 | 1.5 | 0.25 | 0.1 | 0.2 | 0.4 | 1.2 | 1.4 |
|  | Glycerin |  |  | 15.0 | 15.0 | 15.0 | 20.0 | 20.0 | 13.0 | 12.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 70:30 | 95:5 | 98:2 | 80:20 | 80:20 | 80:20 | 80:20 |
|  | Total amount of dyes in ink (wt %) |  |  | 5.0 | 5.0 | 5.0 | 1.0 | 2.0 | 6.0 | 7.0 |
| Evaluation | Ejection stability evaluation |  |  | A | A | A | A | A | A | B |
|  | Color developing properties evaluation |  |  | A | A | A | A | A | A | A |
|  | Bronzing evaluation |  |  | A | A | B | A | A | A | B |
|  | Ozone resistance evaluation |  |  | A | A | A | B | A | A | A |
|  | Light resistance evaluation |  |  | A | A | A | A | A | A | A |
|  | Comprehensive evaluation |  |  | G | G | G | G | G | G | G |

(*1): Acetylene glycol surfactant (ethylene oxide adduct (10 mol) of diol, Nissin Chemical Industry Co., Ltd.)

TABLE 4

|  |  |  |  | Ex. 42 | Ex. 43 | Ex. 44 | Ex. 45 | Ex. 46 | Ex. 47 | Ex. 48 |
|---|---|---|---|---|---|---|---|---|---|---|
| Ink composition (wt %) | Coloring agent | Dye (1) | Dye (1-A) | 4.0 | — | — | — | — | — | 3.0 |
|  |  |  | Dye (1-B) | — | 4.0 | — | — | — | — | — |
|  |  |  | Dye (1-C) | — | — | 4.0 | — | — | — | — |
|  |  |  | Dye (1-D) | — | — | — | 3.75 | — | — | — |
|  |  |  | Dye (1-E) | — | — | — | — | 4.5 | — | — |
|  |  |  | Dye (1-F) | — | — | — | — | — | 4.0 | — |
|  |  | Dye (2) | C.I. Direct Blue 86 | 1.0 | 1.0 | 1.0 | 1.25 | 0.5 | 1.0 | 2.0 |
|  | Glycerin |  |  | 15.0 | 15.0 | 15.0 | 15.0 | 15.0 | 15.0 | 15.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 80:20 | 80:20 | 80:20 | 75:25 | 90:10 | 80:20 | 60:40 |
|  | Total amount of dyes in ink (wt %) |  |  | 5.0 | 5.0 | 5.0 | 5.0 | 5.0 | 5.0 | 5.0 |
| Evaluation | Ejection stability evaluation |  |  | A | A | A | A | A | A | A |
|  | Color developing properties evaluation |  |  | A | A | A | A | A | A | A |
|  | Bronzing evaluation |  |  | A | A | A | A | A | A | A |
|  | Ozone resistance evaluation |  |  | A | A | A | A | A | A | B |
|  | Light resistance evaluation |  |  | A | A | A | A | A | A | A |
|  | Comprehensive evaluation |  |  | G | G | G | G | G | G | G |

|  |  |  |  | Ex. 49 | Ex. 50 | Ex. 51 | Ex. 52 | Ex. 53 | Ex. 54 | Ex. 55 |
|---|---|---|---|---|---|---|---|---|---|---|
| Ink composition (wt %) | Coloring agent | Dye (1) | Dye (1-A) | 3.5 | 4.75 | 4.9 | — | — | — | — |
|  |  |  | Dye (1-B) | — | — | — | 0.8 | 1.6 | 4.8 | 5.6 |
|  |  |  | Dye (1-C) | — | — | — | — | — | — | — |
|  |  |  | Dye (1-D) | — | — | — | — | — | — | — |
|  |  |  | Dye (1-E) | — | — | — | — | — | — | — |
|  |  |  | Dye (1-F) | — | — | — | — | — | — | — |
|  |  | Dye (2) | C.I. Direct Blue 86 | 1.5 | 0.25 | 0.1 | 0.2 | 0.4 | 1.2 | 1.4 |
|  | Glycerin |  |  | 15.0 | 15.0 | 15.0 | 20.0 | 20.0 | 13.0 | 12.0 |
|  | Polyethylene glycol # 200 |  |  | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 |
|  | Water |  |  | Balance | Balance | Balance | Balance | Balance | Balance | Balance |
| Ink | Dye (1):Dye (2) (weight ratio) |  |  | 70:30 | 95:5 | 98:2 | 80:20 | 80:20 | 80:20 | 80:20 |
|  | Total amount of dyes in ink (wt %) |  |  | 5.0 | 5.0 | 5.0 | 1.0 | 2.0 | 6.0 | 7.0 |
| Evaluation | Ejection stability evaluation |  |  | A | A | A | A | A | A | B |
|  | Color developing properties evaluation |  |  | A | A | A | A | A | A | A |
|  | Bronzing evaluation |  |  | A | A | B | A | A | A | B |
|  | Ozone resistance evaluation |  |  | A | A | A | B | A | A | A |
|  | Light resistance evaluation |  |  | A | A | A | A | A | A | A |
|  | Comprehensive evaluation |  |  | G | G | G | G | G | G | G |

(*1): Acetylene glycol surfactant (ethylene oxide adduct (10 mol) of diol, Nissin Chemical Industry Co., Ltd.)

TABLE 5

|  |  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Ink composition (wt %) | Coloring agent | Dye (1) | Dye (1-A) | 5.0 | — | 4.0 | 4.0 | — | — |
|  |  | Dye (2) | Dye (2a-A) | — | 5.0 | — | — | 4.0 | 4.0 |
|  |  | Comparative dye | C.I. Acid Blue 9 | — | — | 1.0 | — | 1.0 | — |
|  |  |  | C.I. Acid Blue 74 | — | — | — | 1.0 | — | 1.0 |
|  | Glycerin |  |  | 15.0 | 15.0 | 15.0 | 15.0 | 15.0 | 15.0 |
|  | Polyethylene glycol # 200 |  |  | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 |
|  | Water |  |  | Balance | Balance | Balance | Balance | Balance | Balance |
| Ink | Dye (1):Dye (2) (weight ratio) (*2) |  |  | 100:0 | 0:100 | 80:20 | 80:20 | 80:20 | 80:20 |
|  | Total amount of dyes in ink (wt %) |  |  | 5.0 | 5.0 | 5.0 | 5.0 | 5.0 | 5.0 |
| Evaluation | Ejection stability evaluation |  |  | A | C | A | A | C | C |
|  | Color developing properties evaluation |  |  | C | A | A | C | A | C |
|  | Bronzing evaluation |  |  | C | A | A | A | A | A |
|  | Ozone resistance evaluation |  |  | A | A | D | D | D | D |
|  | Light resistance evaluation |  |  | A | A | D | D | D | D |
|  | Comprehensive evaluation |  |  | NG | NG | NG | NG | NG | NG |

(*1): Acetylene glycol surfactant (ethylene oxide adduct (10 mol) of diol, Nissin Chemical Industry Co., Ltd.)
(*2): In Comparative Examples 3 and 4, the ratios indicate the weight ratios of the dye (1) to the comparative dye. In Comparative Examples 5 and 6, the ratios indicate the weight ratios of the dye (2) to the comparative dye.

TABLE 6

|  |  |  |  | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|---|---|---|
| Ink composition (wt %) | Coloring agent | Dye (2) | Dye (2b-A) | 5.0 | 4.0 | 4.0 | — | — | — | — | — | — |
|  |  |  | C.I. Direct Blue 199 | — | — | — | 5.0 | 4.0 | 4.0 | — | — | — |
|  |  |  | C.I. Direct Blue 86 | — | — | — | — | — | — | 5.0 | 4.0 | 4.0 |
|  |  | Comparative dye | C.I. Acid Blue 9 | — | 1.0 | — | — | 1.0 | — | — | 1.0 | — |
|  |  |  | C.I. Acid Blue 74 | — | — | 1.0 | — | — | 1.0 | — | — | 1.0 |
|  | Glycerin |  |  | 15.0 | 15.0 | 15.0 | 15.0 | 15.0 | 15.0 | 15.0 | 15.0 | 15.0 |
|  | Polyethylene glycol # 200 |  |  | 10.0 | 10.0 | 10.0 | 10.0 | 10.0 | 10.0 | 10.0 | 10.0 | 10.0 |
|  | Triethylene glycol-n-butyl ether |  |  | 3.0 | 3.0 | 3.0 | 3.0 | 3.0 | 3.0 | 3.0 | 3.0 | 3.0 |
|  | OLFIN ® E1010 (*1) |  |  | 0.2 | 0.2 | 0.2 | 0.2 | 0.2 | 0.2 | 0.2 | 0.2 | 0.2 |
|  | Water |  |  | Balance | Balance | Balance | Balance | Balance | Balance | Balance | Balance | Balance |
| Ink | Dye (1):Dye (2) (weight ratio) (*2) |  |  | 0:100 | 80:20 | 80:20 | 0:100 | 80:20 | 80:20 | 0:100 | 80:20 | 80:20 |
|  | Total amount of dyes in ink (wt %) |  |  | 5.0 | 5.0 | 5.0 | 5.0 | 5.0 | 5.0 | 5.0 | 5.0 | 5.0 |
| Evaluation | Ejection stability evaluation |  |  | A | A | A | A | A | A | A | A | A |
|  | Color developing properties evaluation |  |  | A | A | C | A | A | C | A | A | C |
|  | Bronzing evaluation |  |  | A | A | A | A | A | A | A | A | A |
|  | Ozone resistance evaluation |  |  | C | D | D | C | D | D | C | D | D |
|  | Light resistance evaluation |  |  | A | D | D | A | D | D | A | D | D |
|  | Comprehensive evaluation |  |  | NG | NG | NG | NG | NG | NG | NG | NG | NG |

(*1): Acetylene glycol surfactant (ethylene oxide adduct (10 mol) of diol, Nissin Chemical Industry Co., Ltd.)
(*2): In Comparative Examples 8, 9, 11, 12, 14 and 15, the ratios indicate the weight ratios of the dye (2) to the comparative dye.

As summarized in Table 1, the water-based inks of Examples 1 to 13, in which the dye (1) and the dye (2) (the dye represented by the general formula (2a)) were used in combination, showed favorable results in all the evaluations. Examples 6 to 9 were carried out under the same conditions except for the weight ratio of the dye (1) to the dye (2). The water-based inks of Examples 7 and 8, in which Dye (1):Dye (2)=70:30 to 95:5 (weight ratio), showed excellent results in the ejection stability evaluation and the bronzing evaluation. Examples 10 to 13 were carried out under the same conditions except for the total amount of the dyes to be added to the water-based ink. The water-based inks of Examples 11 and 12, in which the total amount of the dyes is 2 wt % to 6 wt %, showed excellent results in the ejection stability evaluation, the bronzing evaluation, and the ozone resistance evaluation.

As summarized in Table 2, the water-based inks of Examples 14 to 27, in which the dye (1) and the dye (2) (the dye represented by the general formula (2b)) were used in combination, showed favorable results in all the evaluations. Examples 20 to 23 were carried out under the same conditions except for the weight ratio of the dye (1) to the dye (2). The water-based inks of Examples 21 and 22, in which Dye (1): Dye (2)=70:30 to 95:5 (weight ratio), showed excellent results in the bronzing evaluation and the ozone resistance evaluation. Examples 24 to 27 were carried out under the same conditions except for the total amount of the dyes to be added to the water-based ink. The water-based inks of Examples 25 and 26, in which the total amount of the dyes is 2 wt % to 6 wt %, showed excellent results in the ejection stability evaluation, the bronzing evaluation, and the ozone resistance evaluation.

As summarized in Table 3, the water-based inks of Examples 28 to 41, in which the dye (1) and the dye (2) (C. I. Direct Blue 199) were used in combination, showed favorable results in all the evaluations. Examples 34 to 37 were carried out under the same conditions except for the weight ratio of the dye (1) to the dye (2). The water-based inks of Examples 35 and 36, in which Dye (1):Dye (2)=70:30 to 95:5 (weight ratio), showed excellent results in the bronzing evaluation and the ozone resistance evaluation. Examples 38 to 41 were carried out under the same conditions except for the total amount of the dyes to be added to the water-based ink. The water-based inks of Examples 39 and 40, in which the total amount of the dyes is 2 wt % to 6 wt %, showed excellent results in the ejection stability evaluation, the bronzing evaluation, and the ozone resistance evaluation.

As summarized in Table 4, the water-based inks of Examples 42 to 55, in which the dye (1) and the dye (2) (C. I. Direct Blue 86) were used in combination, showed favorable results in all the evaluations. Examples 48 to 51 were carried out under the same conditions except for the weight ratio of the dye (1) to the dye (2). The water-based inks of Examples 49 and 50, in which Dye (1):Dye (2)=70:30 to 95:5 (weight ratio), showed excellent results in the bronzing evaluation and the ozone resistance evaluation. Examples 52 to 55 were carried out under the same conditions except for the total amount of the dyes to be added to the water-based ink. The water-based inks of Examples 53 and 54, in which the total amount of the dyes is 2 wt % to 6 wt %, showed excellent results in the ejection stability evaluation, the bronzing evaluation, and the ozone resistance evaluation.

In contrast, as summarized in Tables 5 and 6, the water-based ink of Comparative Example 1, which does not contain the dye (2), showed unfavorable results in the color developing properties evaluation and the bronzing evaluation. The water-based ink of Comparative Examples 2, 7, 10 and 13, which does not contain the dye (1), showed an unfavorable result in the ejection stability evaluation or the ozone resistance evaluation. The water-based ink of Comparative Example 3, in which C. I. Acid Blue 9 was used instead of the dye (2), showed poor results in the ozone resistance evaluation and the light resistance evaluation. The water-based ink of Comparative Example 4, in which C. I. Acid Blue 74 was used instead of the dye (2), showed an unfavorable result in the color developing properties evaluation and showed poor results in the ozone resistance evaluation and the light resistance evaluation. The water-based ink of Comparative Examples 5, 8, 11 and 14, in which C. I. Acid Blue 9 was used instead of the dye (1), showed poor results in the ozone resistance evaluation and the light resistance evaluation, and the water-based ink of Comparative Example 5 showed an unfavorable result in the ejection stability evaluation. The water-based ink of Comparative Examples 6, 9, 12 and 15, in which C. I. Acid Blue 74 was used instead of the dye (1), showed an unfavorable result in the color developing properties evaluation and showed poor results in the ozone resistance evaluation and the light resistance evaluation, and the water-based ink of Comparative Example 6 showed an unfavorable result in the ejection stability evaluation.

It will be obvious to those having skill in the art that many changes may be made in the above-described details of the particular aspects described herein without departing from the spirit or scope of the invention as defined in the appended claims.

What is claimed is:

1. A water-based ink for ink-jet recording, comprising:

a coloring agent;

water; and a water-soluble organic solvent, wherein the coloring agent comprises the following a dye (1) and a dye (2):

dye (1): a dye represented by the general formula (1)

dye (2): at least one dye selected from the group consisting of dyes represented by the general formula (2a), dyes represented by the general formula (2b), C. I. Direct Blue 199, and C. I. Direct Blue 86

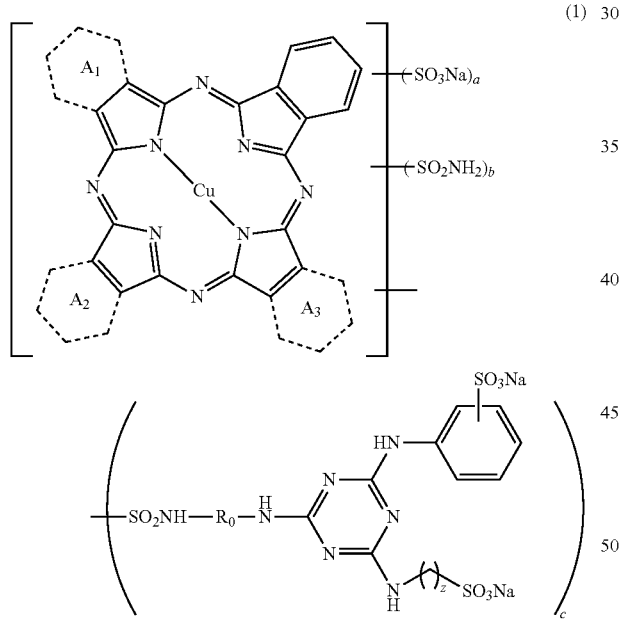

(1)

where in the general formula (1), rings $A_1$, $A_2$, and $A_3$ each represent a benzene ring, a 2,3-pyridine ring, or a 3,2-pyridine ring, at least one of the rings $A_1$, $A_2$, and $A_3$ is a 2,3-pyridine ring or a 3,2-pyridine ring, and the rings $A_1$, $A_2$, and $A_3$ may be identical to or different from each other;

a satisfies $0 \leq a \leq 4$, b satisfies $0 \leq b \leq 4$, c satisfies $0 \leq c-4$, and a, b and c satisfy $0 \leq a+b+c \leq 4$;

z is an integer satisfying $1 \leq z \leq 3$; and $R_0$ is a straight chain alkyl group having 1 to 6 carbon atoms,

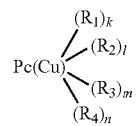

(2a)

where in the general formula (2a),

Pc (Cu) represents a copper phthalocyanine nucleus represented by the following general formula (Pc);

$R_1$, $R_2$, $R_3$, and $R_4$ each represent a substituent selected from the group consisting of —$SO_2R_a$, —$SO_2NR_bR_c$, and —$CO_2R_a$, $R_1$, $R_2$, $R_3$, and $R_4$ are not all identical, at least one of $R_1$, $R_2$, $R_3$, and $R_4$ has an ionic hydrophilic group as a substituent, and at least one of $R_1$, $R_2$, $R_3$, and $R_4$ is present on any of the four benzene rings A, B, C, and D of the copper phthalocyanine nucleus represented by the general formula (Pc);

$R_a$ represents a substituted or unsubstituted alkyl group, $R_b$ represents a hydrogen atom or a substituted or unsubstituted alkyl group, and $R_c$ represents a substituted or unsubstituted alkyl group;

k satisfies $0<k<8$, l satisfies $0<l<8$, m satisfies $0 \leq m<8$, n satisfies $0 \leq n<8$, and k, l, m, and n satisfy $4 \leq k+l+m+n \leq 8$,

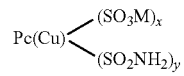

(2b)

where in the general formula (2b),

Pc (Cu) represents a copper phthalocyanine nucleus represented by the general formula (Pc):

M represents lithium, sodium, potassium, or ammonium;

x satisfies $0<x<4$, y satisfies $0<y<4$, and x and y satisfy $2 \leq x+y \leq 5$;

a $SO_3M$ group and a $SO_2NH_2$ group are present on any of the four benzene rings A, B, C, and D of the copper phthalocyanine nucleus represented by the general formula (Pc),

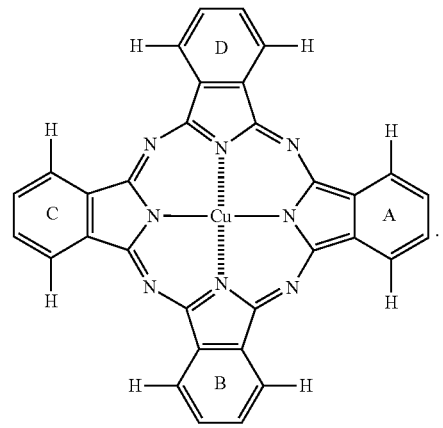

(Pc)

2. The water-based ink for ink-jet recording according to claim 1, wherein a weight ratio of the dye (1) to the dye (2) in the water-based ink is about 70:30 to about 95:5 (dye (1):dye (2)).

3. The water-based ink for ink-jet recording according to claim 1, wherein a total amount of the dye (1) and the dye (2) relative to an amount of the water-based ink is about 2 wt % to about 6 wt %.

4. The water-based ink for ink-jet recording according to claim 1, where in the general formula (2a), $R_1$, $R_2$, $R_3$, and $R_4$ each represent —$SO_2R_a$; the respective $R_a$s in $R_1$, $R_2$, $R_3$, and $R_4$ are not all identical; and at least one of the $R_a$s is a substituted alkyl group having an ionic hydrophilic group.

5. The water-based ink for ink-jet recording according to claim 1, where in the general formula (2a), k satisfies $0<k<4$, l satisfies $0<l<4$, m satisfies $0\leqq m<4$, satisfies $0\leqq n<4$, and k, l, m, and n satisfy $k+l+m+n=4$.

6. The water-based ink for ink-jet recording according to claim 1, where in the general formula (2b), x and y satisfy $x+y=4$.

7. An ink cartridge comprising a water-based ink for ink-jet recording, wherein the water-based ink is the water-based ink for ink-jet recording according to claim 1.

8. An ink-jet recording apparatus, comprising:
   an ink storing portion; and
   an ink ejecting unit, an ink stored in the ink storing portion being ejected by the ink ejecting unit, wherein
the ink cartridge according to claim 7 is stored in the ink storing portion.

* * * * *

UNITED STATES PATENT AND TRADEMARK OFFICE
CERTIFICATE OF CORRECTION

PATENT NO. : 8,430,953 B2  
APPLICATION NO. : 12/888667  
DATED : April 30, 2013  
INVENTOR(S) : Kenta Hayashida et al.

Page 1 of 1

It is certified that error appears in the above-identified patent and that said Letters Patent is hereby corrected as shown below:

On the Title Page

In the Abstract:
Please delete

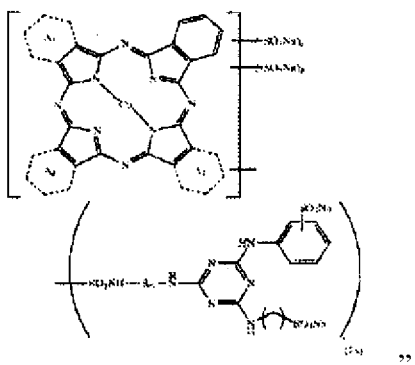

" "

Please insert

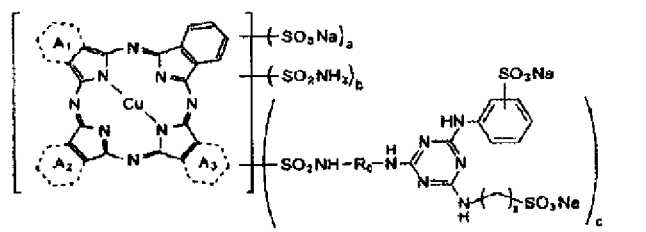

-- --

In the Claims

In Column 31, Claim 1, Line 62:
Please delete "c satisfies 0≤c-4," and insert -- c satisfies 0≤c≤4, --

Signed and Sealed this  
Twenty-fifth Day of November, 2014

Michelle K. Lee  
*Deputy Director of the United States Patent and Trademark Office*